United States Patent
Kumfer et al.

(10) Patent No.: US 10,053,375 B2
(45) Date of Patent: Aug. 21, 2018

(54) METHODS AND SYSTEMS FOR TREATING SPENT CAUSTIC AND REGENERATING MEDIA

(71) Applicant: Siemens Energy, Inc., Orlando, FL (US)

(72) Inventors: Bryan J. Kumfer, Ringle, WI (US); Andrea J. Larson, Wausau, WI (US); Chad L. Felch, Kronenwetter, WI (US); Mark Clark, Wausau, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 482 days.

(21) Appl. No.: 14/436,918

(22) PCT Filed: Oct. 22, 2013

(86) PCT No.: PCT/US2013/066102
§ 371 (c)(1),
(2) Date: Apr. 20, 2015

(87) PCT Pub. No.: WO2014/066338
PCT Pub. Date: May 1, 2015

(65) Prior Publication Data
US 2015/0284264 A1    Oct. 8, 2015

Related U.S. Application Data

(60) Provisional application No. 61/718,774, filed on Oct. 26, 2012.

(51) Int. Cl.
*B01D 17/02* (2006.01)
*C02F 1/28* (2006.01)
(Continued)

(52) U.S. Cl.
CPC ......... *C02F 1/288* (2013.01); *B01D 17/0214* (2013.01); *C02F 1/28* (2013.01);
(Continued)

(58) Field of Classification Search
CPC ......... C02F 1/283; C02F 1/285; C02F 1/286; C02F 1/288; C02F 1/40; C02F 1/66;
(Continued)

(56) References Cited

U.S. PATENT DOCUMENTS

| | | | |
|---|---|---|---|
| 4,049,546 A | | 9/1977 | Rock |
| 4,695,386 A | * | 9/1987 | Berry ..................... C02F 1/283 |
| | | | 210/665 |

(Continued)

FOREIGN PATENT DOCUMENTS

| | | |
|---|---|---|
| CN | 1462729 A | 12/2003 |
| CN | 101134616 A | 3/2008 |

(Continued)

OTHER PUBLICATIONS

PCT International Search Report dated Mar. 26, 2014 corresponding to PCT International Application No. PCT/US2013/066102 filed Oct. 22, 2013 (20 pages).

(Continued)

*Primary Examiner* — David C Mellon
*Assistant Examiner* — Benjamin L Lebron

(57) ABSTRACT

Methods and systems for applying separation processes to a spent caustic stream are disclosed. Methods and systems for regenerating media utilized in spent caustic separation processes are disclosed.

10 Claims, 23 Drawing Sheets

(51) Int. Cl.

| | | |
|---|---|---|
| *C02F 1/40* | (2006.01) | |
| *C02F 1/66* | (2006.01) | |
| *C02F 3/00* | (2006.01) | |
| *C02F 3/02* | (2006.01) | |
| *C02F 9/00* | (2006.01) | |
| *C10G 19/02* | (2006.01) | |
| *C10G 19/08* | (2006.01) | |
| *C10G 25/12* | (2006.01) | |
| *C02F 1/74* | (2006.01) | |
| *C02F 101/10* | (2006.01) | |
| *C02F 101/32* | (2006.01) | |
| *C02F 101/34* | (2006.01) | |
| *C02F 103/36* | (2006.01) | |

(52) U.S. Cl.
CPC .............. *C02F 3/00* (2013.01); *C02F 9/00* (2013.01); *C10G 19/02* (2013.01); *C10G 19/08* (2013.01); *C10G 25/12* (2013.01); *C02F 1/283* (2013.01); *C02F 1/285* (2013.01); *C02F 1/286* (2013.01); *C02F 1/40* (2013.01); *C02F 1/66* (2013.01); *C02F 1/74* (2013.01); *C02F 3/02* (2013.01); *C02F 2101/101* (2013.01); *C02F 2101/327* (2013.01); *C02F 2101/345* (2013.01); *C02F 2103/365* (2013.01); *C02F 2209/06* (2013.01); *C02F 2209/08* (2013.01); *C02F 2303/16* (2013.01); *Y02W 10/15* (2015.05)

(58) Field of Classification Search
CPC ...... C02F 1/42; C02F 3/00; C02F 3/02; C02F 9/00; C02F 2101/101; C02F 2101/327; C02F 2101/345; C02F 2101/003; C02F 2101/12; C02F 2101/163; C02F 2103/28; C02F 2103/365; C02F 2103/34; C02F 2209/08; C02F 2303/16; C02F 1/32; C02F 1/44; C02F 1/441; C02F 1/459; C02F 2101/103; C02F 2101/365; C02F 2209/06; C02F 2209/02; B01J 49/53; B01J 49/57; B01J 47/014; B01J 41/07; B01D 15/00; B01D 17/0214; C10G 19/08; C10G 19/02; C10G 25/12; Y02W 10/15

See application file for complete search history.

(56) References Cited

U.S. PATENT DOCUMENTS

| | | | | |
|---|---|---|---|---|
| 5,635,078 | A * | 6/1997 | Yan | C02F 1/281 |
| | | | | 210/763 |
| 6,398,965 | B1 * | 6/2002 | Arba | C02F 1/42 |
| | | | | 210/257.2 |
| 2003/0034299 | A1 * | 2/2003 | Moghe | C02F 1/5245 |
| | | | | 210/601 |
| 2004/0245188 | A1 * | 12/2004 | Chowdhury | C02F 1/66 |
| | | | | 210/758 |
| 2009/0204419 | A1 * | 8/2009 | Stewart | B01D 61/025 |
| | | | | 705/1.1 |
| 2010/0051556 | A1 * | 3/2010 | Grott | C02F 1/42 |
| | | | | 210/673 |
| 2010/0122950 | A1 * | 5/2010 | Varadi | B01D 17/0214 |
| | | | | 210/188 |
| 2011/0006002 | A1 * | 1/2011 | Conner | C02F 9/00 |
| | | | | 210/631 |
| 2012/0137883 | A1 | 6/2012 | Bradley | |

FOREIGN PATENT DOCUMENTS

| | | |
|---|---|---|
| CN | 101475274 A | 7/2009 |
| CN | 101570370 A | 11/2009 |
| CN | 201648046 U | 11/2010 |
| JP | S5778927 A | 5/1982 |

OTHER PUBLICATIONS

Communication pursuant to Article 94 (3) EPC, application No. 13785781.9-1371, reference No. P38411-WOEP H, dated Apr. 6, 2017.

* cited by examiner

METHODS AND SYSTEMS FOR TREATING SPENT CAUSTIC AND REGENERATING MEDIA

FIELD OF TECHNOLOGY

One or more aspects of the disclosure relate generally to separations, and more particularly to systems and methods for separating components from a spent caustic feed and regenerating media utilized in separations.

SUMMARY

One or more aspects of the disclosure provide for a method for treating a spent caustic stream. The method comprises providing a source of the spent caustic stream. The method further comprises reducing a pH of a first portion of the spent caustic stream to provide an acidified stream. The method further comprises introducing a first portion of the acidified stream to a first inlet of a first vessel comprising adsorbent media to provide a polished stream. The method further comprises introducing a second portion of the spent caustic stream to a second inlet of the first vessel to regenerate the adsorbent media in the first vessel.

The step of reducing the pH of the first portion of the spent caustic to provide the acidified stream may further comprise introducing the first portion of the spent caustic stream to a separation zone after reducing the pH. The method may further comprise introducing the first portion of the acidified stream to an inlet of a walnut shell filter apparatus prior to introducing the first portion of acidified stream to the first inlet of the first vessel comprising adsorbent media. The method may further comprise introducing at least one of a third portion of the spent caustic stream, a second portion of the acidified stream, and a portion of the polished stream to a second inlet of the walnut shell filter apparatus and backwashing the walnut shell filter apparatus with at least one of the third portion of the spent caustic stream, the second portion of the acidified stream, and the portion of the polished stream. The method may further comprise ceasing introduction of the first portion of the acidified stream to the first inlet of the first vessel prior to introducing the second portion of the spent caustic stream to the second inlet of the first vessel. The method may further comprise introducing the first portion of the acidified stream to a first inlet of a second vessel comprising the adsorbent media, wherein introducing the the first portion of acidified stream to the second vessel and introducing the second portion of the spent caustic stream to the first vessel occur simultaneously. The method may further comprise introducing the second portion of the spent caustic stream to a second inlet of the second vessel to regenerate the adsorbent media in the second vessel, wherein introducing the second portion of the spent caustic stream to the second vessel and introducing the first portion of acidified stream to the first vessel occur simultaneously. The method may further comprise reducing the pH of the first portion of the spent caustic stream comprises reducing the pH to less than about 7. The step of reducing the pH of the first portion of the spent caustic stream may further comprise reducing the pH to a range of about 2 to about 3. The step of introducing the first portion of the acidified stream may further comprise passing the first portion of the acidified stream through the first vessel comprising adsorbent media at a flow rate in a range of about 1 m$^3$/hr to about 4 m$^3$/hr. The adsorbent media may comprise at least one of granular activated carbon and a polymeric adsorbent. A chemical oxygen demand of the polished stream may be less than about 2000 mg/l. The step of introducing the second portion of the spent caustic stream to the second inlet of the first vessel to regenerate the adsorbent media in the first vessel may comprise regenerating the adsorbent media to at least 80% of a virgin adsorption capacity of the adsorbent media.

One or more additional aspects of the disclosure provides for a method for treating a spent caustic stream. The method comprises reducing a pH of the spent caustic stream to produce a reduced pH spent caustic stream. The method further comprises separating the reduced pH spent caustic stream to produce an acidified stream. The method further comprises adsorbing organic compounds from the acidified stream onto adsorbent media positioned in a vessel to provide a treated stream. The method further comprises measuring a chemical oxygen demand of the treated stream. The method further comprises desorbing organic compounds from the adsorbent media positioned in the vessel, when the chemical oxygen demand of the treated stream is greater than 2000 mg/l.

The method may further comprise introducing the treated stream to a biological treatment process. The adsorbent media may comprise at least one of granular activated carbon and a polymeric adsorbent. The step of desorbing may comprise passing a portion of the spent caustic stream through the adsorbent media positioned in the vessel. The step of desorbing may comprise passing a steam, for example, a low pressure steam, through the adsorbent media positioned in the vessel to produce a regeneration effluent. The steam, for example, low pressure steam, may have a pressure in the range of about 30 psi to about 100 psi. The method may further comprise treating the regeneration effluent to remove at least a portion of an unwanted species comprising at least one of phenolic or cresylic compounds.

One or more additional aspects of the disclosure provides for a method of facilitating regeneration of adsorbent media in a spent caustic treatment system, the system comprising a mixing tank fluidly connected to a source of acid and a source of spent caustic, and a first inlet of a vessel comprising adsorbent media fluidly connected to an outlet of the mixing tank. The method comprises connecting a second inlet of the vessel comprising adsorbent media to the source of spent caustic.

The method may further comprise closing the first inlet of the vessel, prior to opening the second inlet of the vessel. The method may further comprise closing the second inlet of the vessel, prior to opening the first inlet of the vessel. The adsorbent media may comprise at least one of granular activated carbon and a polymeric adsorbent. The spent caustic treatment system may further comprise a walnut shell filter apparatus fluidly connected to and downstream of the outlet of the mixing tank and fluidly connected to and upstream of the first inlet of the vessel comprising adsorbent media. The spent caustic treatment system may further comprise an inlet of a separation zone fluidly connected to the outlet of the mixing tank, and an outlet of the separation zone fluidly connected to the first inlet of the vessel comprising adsorbent media.

One or more additional aspects of the disclosure provides for a system for treating a spent caustic stream. The system comprises a mixing tank fluidly connected to a source of spent caustic and a source of acid. The system further comprises a first vessel comprising adsorbent media, a first inlet of the first vessel fluidly connected to and downstream of an outlet of the mixing tank, and a second inlet of the first vessel fluidly connected to and downstream of one of the source of spent caustic and a source of steam, for example, low pressure steam.

The system may further comprise a separator, an inlet of the separator fluidly connected to and downstream of the outlet of the mixing tank, and an outlet of the separator fluidly connected to and upstream of the first inlet of the first vessel comprising adsorbent media. The adsorbent media may comprise one of granular activated carbon and a polymeric adsorbent. The system may further comprise a walnut shell filter apparatus, an inlet of the walnut shell filter apparatus fluidly connected to and downstream of the outlet of the mixing tank and an outlet of the walnut shell filter apparatus fluidly connected to and upstream of the first inlet of the first vessel comprising adsorbent media. The system may further comprise a second vessel comprising adsorbent media fluidly connected to the mixing tank and to one of the source of spent caustic and the source steam, for example, low pressure steam. The steam, for example, low pressure steam, may have a pressure in the range of about 30 psi to about 100 psi. The system may further comprise a sensor positioned downstream of the first vessel and configured to measure a chemical oxygen demand of a treated spent caustic stream that is positioned downstream of the first vessel; and a control system in communication with the sensor, wherein the control system is configured to initiate a regeneration of the adsorbent media in the first vessel when the sensor measures a value greater than a predetermined set point for chemical oxygen demand. The predetermined set point for chemical oxygen demand may be from about 1000 mg/l to about 5000 mg/l.

DESCRIPTION OF THE DRAWINGS

The accompanying drawings are not intended to be drawn to scale. For purposes of clarity, not every component may be labeled in the drawings, nor is every component of each embodiment of the disclosure shown where illustration is not necessary to allow those of ordinary skill in the art to understand the disclosure.

DETAILED DESCRIPTION

Figure 1:
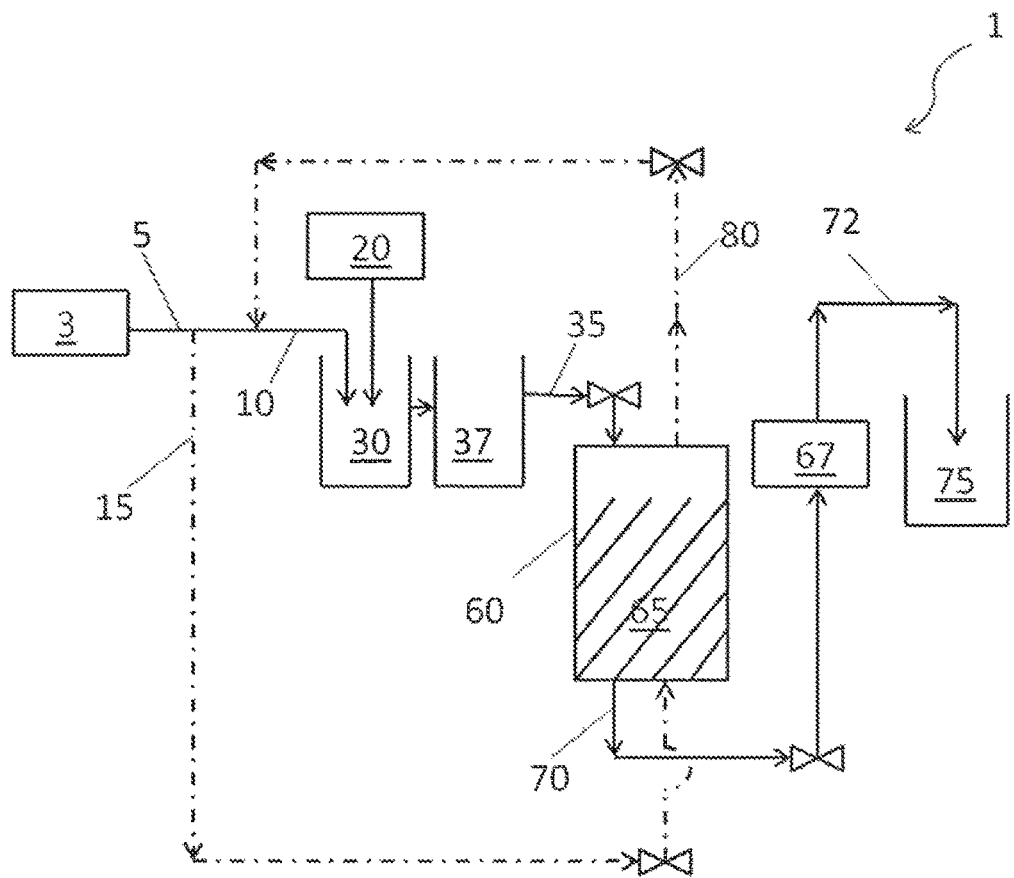
FIG. 1 presents a schematic of a spent caustic treatment system in accordance with one or more embodiments of the disclosure.

Caustic scrubbing solutions containing, for example, sodium hydroxide may be commonly used in petrochemical and petroleum refineries for the removal of acid components such as hydrogen sulfide, cresylic acids and naphthenic acids from the refined product streams. Once used, or spent, the solutions may be difficult to handle and dispose. This may be due to the components in the spent caustic being hazardous, odorous, and/or corrosive. Spent caustic streams may also have other characteristics that can create issues with conventional biological processes such as noxious odors, pH swings, foaming, or poor settling of biological solids. Effluent requirements may be difficult to achieve because some spent caustic contaminants are not readily biodegradable.

Typical processes in the hydrocarbon industry where spent caustic may be generated may include, without limitation, caustic scrubbing of light hydrocarbons, feed streams to isomerization and polymerization units; cracked gases from thermal/catalytic cracking units; and caustic washing of middle distillates. The caustic may become spent as it converts the acidic components into their respective inorganic/organic salts of sodium such as sulfides, carbonates, mercaptides, disulfide oil, phenolates, cresolates, xylenolates and naphthenates. A representative spent caustic waste stream may have a composition by weight of about 70 to about 90% water. It may also comprise about 1 to about 4% NaOH. It further may also comprise about 3 to about 10% Na organic salts. It may further also comprise about 2 to about 10% total organic carbon, and other various compounds.

Three general categories of spent caustics may include sulfidic, cresylic, and naphthenic. Sulfidic spent caustic may be produced, for example, from the caustic scrubbing of ethylene or light petroleum gas (LPG) products which contain high concentrations of sulfides and mercaptans. Cresylic spent caustic may be generated, for example, when scrubbing gasoline produced by fluidized bed catalytic cracking processes with the resulting spent caustic containing high concentrations of organic compounds including phenols and cresols. This type of spent caustic may also contain sulfides and mercaptans. Naphthenic spent caustic may be produced, for example, from the caustic scrubbing of kerosene and diesel products containing high concentrations of polycyclic aliphatic organic compounds such as naphthenic acids. Depending upon the types and quantity of products being produced, a refinery may have varying amounts of one or more of each of these categories of spent caustics that require treatment. In some instances the spent caustics may be combined in various amounts to produce a mixture of spent caustics. When referring generally to "spent caustic" in this disclosure, the spent caustic may include one or more of the types of spent caustics described and may include other spent caustics from other sources, alone or in combination with those described above. It may also refer to a fabricated spent caustic, alone or in combination with one or more of the spent caustics described above.

There are several issues with the treatment of spent caustic streams. Sulfides and mercaptans may have very strong odors. The odor thresholds for these types of compounds are generally in the order of magnitude of parts per billion. In addition, per OSHA, these compounds are considered very toxic and can be potentially hazardous to plant personnel.

High concentrations of phenols in the spent caustic wastewater may cause issues in biological treatment processes. Phenol in concentrations as low as 400 mg/L has been shown to inhibit the removal of COD, ammonia and phosphorous as well as negatively impact the settling characteristics of the sludge. It should be noted that in many refineries, the production of spent caustics containing cresylic acids is performed as a batch process. This may cause periodic discharges of phenols and cresols to the wastewater treatment plant that may cause partial or complete inhibition of the biological treatment system.

Naphthenic acids may have limited biodegradation in conventional biological treatment processes. Naphthenic acids have foaming characteristics that may create issues when aerated or agitated during biological treatment, which may affect the biological treatment.

The untreated spent caustic streams may be high in chemical oxygen demand (COD), for example, in the range of about 15 g/L to about 500 g/L or even greater. The volume of spent caustic that is present may result in a large COD load on downstream biological processes.

Other chemicals that may be of concern in the spent caustic wastewater may include reduced sulfur compounds such as sulfides and mercaptans as well as organic species such as the sodium salts of naphthenic and cresylic acids. Due to the types of chemicals contained in the spent caustic, the spent caustic wastewaters may be environmentally hazardous and difficult to treat with conventional biological treatment. Therefore, treatment techniques may be used to reduce the COD of the spent caustic streams and remove certain species.

Typical treatment techniques used for spent caustic wastewater may include acidification or wet air oxidation (WAO). WAO may require significant capital costs due to expensive materials of construction for the high temperature, high pH treatment, as well as considerable custom engineering.

Alternative methods may provide a more cost effective approach to WAO for the treatment of spent caustics, for example, naphthenic spent caustics. In certain disclosed embodiments, a cost-effective system may be provided in which a raw spent caustic stream comprising a high COD may be acidified to remove a portion of the COD components. The acidified stream may then be directed to adsorbent media which further remove organic species to further reduce the COD of the stream and produce a polished or treated stream. Optionally the stream may also pass through a filtration system. The media may then be regenerated by passing a raw spent caustic stream or a steam, for example, low pressure steam, through the media. In some embodiments the media may be regenerated using raw spent caustic during some regeneration stages, while using steam during other regeneration stages.

Acidification may spring organic oils that can be separated from the aqueous phase and removed from the stream. Acidification may reduce a portion of the COD and foaming tendency by removing the sulfides and naphthenic acids. Acidification may reduce the pH of the spent caustic stream. Acidification may comprise mixing the spent caustic stream with an acid from a source of acid to provide a mixed stream or acidified stream. The source of acid may comprise sulfuric acid. Alternatively, the source of acid may comprise hydrochloric acid, phosphoric acid and the like, and combinations thereof. The acid may be introduced from a source of acid in an amount sufficient to react with the sodium hydroxide, or other caustic component, contained in the spent caustic stream. The source of acid may be introduced in an amount sufficient to reduce the pH of the system. The source of acid may be introduced in an amount sufficient to reduce the pH of the system to a pH of less than 7. The source of acid may be introduced in an amount sufficient to reduce the pH of the system to a range of about 2 to about 3. The source of acid may be introduced in an amount sufficient to reduce the pH of the system to a range of about 1 to about 3.

The mixed stream or acidified stream may then be introduced to a separator where the mixture may separate into different layers. Alternatively, in certain embodiments, the separation may take place in the same tank in which the acid was introduced and/or mixed. The layers may comprise a bottoms layer, that is, a solids layer; a brine layer; and an oils layer. The bottoms layer and the oils layer may be separated out and directed to separate outlets. A large portion of the of the organic compounds making up the stream's COD may reside in the bottoms and oils layers, and, therefore, may be removed along with the bottoms and oils layers, respectively.

Typically, COD reduction may still not be sufficient for effective downstream biological wastewater treatment of the remaining acidified stream, that is, the brine layer. To provide additional COD reduction, a media adsorption step may be added. Using media to allow adsorption of contaminants following acidification may allow further reduction of COD, making the stream more biotreatable in a downstream biological wastewater treatment process.

The media used in the process may include any media that may have adsorptive qualities to allow contaminants to adsorb to the media, and be removed from a stream that passes through the media. The media used may comprise, for example, a carbon source, such as granular activated carbon (GAC). The media used may also comprise a polymeric adsorbent. Both GAC and polymeric adsorbents may adsorb organics, polishing remaining oils and further reducing the COD.

When the media is spent, it may be regenerated and reused. The media may be regenerated with steam, for example, low pressure steam, or raw spent caustic rather than fresh caustic, which is used in some conventional regeneration processes. Regeneration using raw spent caustic is unique and effective. The use of raw spent caustic to regenerate media resulted in unexpected success as it would not have been expected that a stream comprising organic contaminants could nevertheless be successfully implemented in desorbing organic contaminants from the media. Rather than removing the media for regeneration, the media may be regenerated inside the vessel, simplifying the design of the system and reducing the cost. If spent caustic is used to desorb the organics from the media, no additional chemicals are needed for regeneration, only rinse water. The rinse water that may be used may be polished or treated effluent. In some embodiments, all regeneration and rinse water may be re-processed, so that no additional waste streams would require treatment outside the system.

Steam regeneration may provide an alternative or complimentary means of regeneration to spent caustic regeneration. Like spent caustic regeneration, steam regeneration may provide the advantages of regenerating the adsorbent media in place, rather than having to remove the media from their vessels for treatment. Steam regeneration may also provide the advantage of requiring no additional chemicals. In embodiments utilizing low pressure steam, the energy requirements for producing low pressure steam may be minimized Low pressure steam may be understood to be steam having a pressure of about 200 psi or less.

In certain embodiments, both spent caustic regeneration and steam regeneration may be utilized together. For example, during some regeneration cycles steam regeneration may be utilized, while during other regeneration cycles spent caustic regeneration may be utilized. For example, a spent caustic treatment system may alternate every cycle between spent caustic regeneration and steam regeneration. In certain embodiments, steam regeneration may take place in most cycles, while spent caustic regeneration takes place at least once within a series of steam regeneration cycles. In other embodiments, steam regeneration may take place in most cycles, while spent caustic regeneration may take place intermittently between the steam regeneration cycles. In other certain embodiments, steam regeneration may take place in most cycles, while spent caustic regeneration takes place from every third cycle to every tenth cycle.

In other embodiments, spent caustic regeneration may take place in most cycles, while steam regeneration takes place at least once within a series of spent caustic regeneration cycles. In other embodiments, spent caustic regeneration may take place in most cycles, while steam regeneration may take place intermittently between the spent regeneration cycles. In other certain embodiments, spent caustic regeneration may take place in most cycles, while steam regeneration takes place from every third cycle to every tenth cycle.

The regeneration effluent, laden with desorbed organic species, may either be recycled back into the system to be treated by acidification and/or adsorbent media or it may be directed to additional treatment.

The additional treatment may apply to all of the regeneration effluent or it may apply to only a portion of the regeneration effluent. For example the additional treatment may apply only to a first portion of the regeneration effluent, created during an early portion of the regeneration cycle, where the concentration of unwanted species may be expected to be highest because the loading on the media is still relatively high. This first portion may constitute, for example, up to a quarter of total regeneration effluent created during a regeneration cycle. The additional treatment may comprise removing unwanted species in the regeneration effluent, for example, phenols and cresols.

In certain embodiments, the additional treatment may take place for each cycle in which the regeneration effluent is produced. Alternatively, in certain embodiments, the additional treatment may take place during some regeneration cycles but not others. For example, additional treatment may take place every other cycle. Alternatively, additional treatment may take place from every third cycle to every tenth cycle. Unwanted species may include any species that a user may want to remove, at least partially, from the recycle stream. Removal of the unwanted species may allow for more efficient and effective operation of the system, including more effective biological wastewater treatment as discussed above. The unwanted species may comprise organic species that contribute to COD. The unwanted species may comprise naphthenic acids. The unwanted species may comprise phenol and cresol species.

The additional treatment may comprise acidification of regeneration effluent followed by skimming off the acid oil layer formed by acidification to remove unwanted species, for example, naphthenic acids.

The additional treatment may comprise shifting the solubility equilibrium of unwanted species so that they may be precipitated out of regeneration effluent. The equilibrium may be shifted through changes in the parameters of such variables as, for example, pH, pressure, salts, and temperature, or combinations thereof. For example, some unwanted species, such as phenol and cresol species may be removed through shifting the equilibrium by adding salt to the regeneration effluent. The salt may be added in the amount of about 50 to about 200 g/L. Alternatively or additionally, the temperature of the regeneration effluent may be reduced to aid in removal of unwanted species. For example, the temperature of the regeneration effluent may be reduced to a range of about 3° C. to about 12° C.

The additional treatment may comprise solvent extraction. In this process, a solvent may be added into the regeneration effluent. Unwanted species, for example, phenolic or cresylic compounds may be soluble in the added solvent. Unwanted species may then dissolve in the added solvent. The solvent, along with the dissolved unwanted species, may then be separated from the regeneration effluent.

The additional treatment may comprise distillation of the regeneration effluent in, for example, a distillation column. Distillation may be used to separate unwanted species, for example, phenols or cresols, from the regeneration effluent.

The additional treatment may comprise burning the regeneration effluent, or a portion of the regeneration effluent, in a flare or incinerator to remove unwanted species. In certain embodiments where flaring is utilized, condensation of steam effluent in the condenser may not be required.

The additional treatment options may comprise directing regeneration effluent to a wet air oxidation (WAO) treatment system. The WAO system may be a WAO system configured to treat spent caustic wastewater streams formed during ethylene processing. The WAO system may comprise a WAO reactor. The WAO system may be operated from about 200° C. to about 260° C. and at superatmospheric pressures from about 400 psig to about 1200 psig. The WAO system may be a catalytic WAO system. Naphthenic acids may be removed from the regeneration effluent by, for example, skimming prior to directing the regeneration effluent to WAO treatment. At least a portion of the regeneration effluent may be bled into another waste stream, generated by unrelated processes, prior to the combined stream being introduced to the WAO system. Alternatively, at least a portion of the regeneration effluent may be directed to the WAO system without being combined with another waste stream. Additional treatment by WAO may be particularly advantageous at a site where a WAO system is already present to treat other waste streams.

The additional treatment options may also comprise biological waste water treatment after neutralization, or advanced treatment, such as, bleach, $ClO_2$, catalyst, or Fenton's reagent.

Any one of the additional treatments may be performed exclusively by itself, or may be performed with one or more the other treatment options.

A filter may be used upstream of the media to remove any remaining free oils present after the acidification process and before polishing in the adsorbent media columns. To account for possible variations of components in the feed to the system, the filter may prevent spikes of oil to the adsorbent media columns. The subsequent adsorbent media may have less loading of oil and solids, reducing regeneration frequency or increasing COD reduction. The backwash system for the filter may utilize fluid (for example, raw spent caustic feed, acidified spent caustic feed, or the polished stream, as well as air). The filter may comprise a walnut shell filter. Other filters comprising plastic or wood media may also be used in place of walnut shell.

Using a filter such as a walnut shell filter in this process is unique and effective. The walnut shell filter resulted in unexpected success as it removed more COD than expected. Rather than operating the walnut shell filter to remove crude oil at neutral pH, the walnut shell filter may be operated in acidic conditions to remove acid oils such as naphthenic acids, allowing the downstream polishing steps to be more effective as described above. Also, rather than using feed at a neutral pH, the walnut shell filter may be backwashed with the spent caustic, acidified stream, or polished stream, thereby reducing wastewater volume.

The adsorbent media may be positioned in standard vessels. The systems may not require high temperatures and pressures. A standard system may be designed in various sizes to accommodate the flow rate and COD load of the spent caustic feed for the required treatment. The low temperature, low pressure, and standardized designs may help minimize cost as compared to other treatment technologies such as WAO.

The disclosed system may provide advantages, including without limitation: adequate COD reduction for discharge to biological treatment, for example, less than 2000 mg/l; little to no additional chemicals for regeneration and no additional waste; standard design; and low pressure system with inexpensive materials of construction.

Acidification of spent caustic followed by media polishing may provide a cost effective approach for COD reduction in spent caustic. Regeneration of the media with spent caustic or a source of steam, rather than chemicals, reduces the system's cost, eliminates additional waste streams, and simplifies the design.

Referring to FIG. 1, a schematic is presented of a spent caustic treatment system 1 in accordance with one or more embodiments of the disclosure. The solid lines indicate feed lines and streams associated with the treatment of spent caustic. The dashed lines indicate feed lines and streams associated with the regeneration of filters and media utilized in the treatment of spent caustic.

Source of spent caustic 3 may be provided. Providing source of spent caustic 3 may comprise connecting source of spent caustic 3 to feed line 5 for further treatment. The spent caustic may have a pH greater than about 7. In certain embodiments, the spent caustic may have a pH of about 12 or greater than about 12.

As part of the treatment process, spent caustic stream 5 may be divided into portions. First portion 10 of the spent caustic may be treated to reduce its pH and thereby produce acidified stream 35. The reduction of the pH of first portion 10 of the spent caustic may be accomplished by directing first portion 10 of the spent caustic to mixing tank 30, where an acid from source of acid 20 may also be introduced to mixing tank 30. Source of acid 20 may comprise an aqueous acid. Source of acid 20 may comprise sulfuric acid. Alternatively, source of acid 20 may comprise hydrochloric acid, phosphoric acid and the like, and combinations thereof. Source of acid 20 may be introduced in an amount sufficient to react with the sodium hydroxide contained in the caustic stream. Source of acid 20 may be introduced in an amount sufficient to reduce the pH of the system. Source of acid 20 may be introduced in an amount sufficient to reduce the pH of the system to a pH of less than 7. Source of acid 20 may be introduced in an amount sufficient to reduce the pH of the system to a range of about 2 to about 3. Source of acid 20 may be introduced in an amount sufficient to reduce the pH of the system to a range of about 1 to about 3.

First portion 10 of the caustic stream and source of acid 20 may be thoroughly mixed in mixing tank 30. Mixed stream or acidified stream 35 may then be introduced to separator 37 or separation zone where the mixture may separate, through, for example settling, into distinct layers. Alternatively, in certain embodiments, the separation may take place in tank 30 in which the acid was introduced and/or mixed. The distinct layers may comprise a bottoms layer, that is, a solids layer; a brine layer, or aqueous layer; and an oils layer. The bottoms layer and the oils layer, which lie below and above the brine layer, respectively, may be separated out and directed to separate outlets (not shown in FIG. 1). Separator 37 or separation zone may comprise any of a variety of separation apparatuses known to a person of ordinary skill in the art. Separator 37 or separation zone may, for example, allow for separation by gravitational settling into different layers, followed by directing the different layers to different outlets of the settling tank.

The brine layer may be directed toward further treatment as acidified stream 35. While the system is operating in a spent caustic treatment stage, the optional valve shown along feed line 35 may be in an open position, directing acidified stream 35 into vessel 60. Vessel 60 may, for example, be a vertical column.

Vessel 60 may comprise media 65. Vessel 60 may comprise adsorbent media 65. Media 65 may be in the form of a fixed bed. Media 65 may comprise activated carbon. Media 65 may comprise granular activated carbon (GAC). Media 65 may comprise adsorbent polymers, also referred to as polymeric adsorbent.

GAC may be derived from a number of sources. In a preferred embodiment, GAC may be wood-based. Alternatively, GAC may be derived from, for example, coconut, bituminous, lignite, or petroleum. The GAC may, for example, comprise NUCHAR® WV-B. NUCHAR® WV-B is produced by the MeadWestvaco Corporation. NUCHAR® WV-B is a low-density, high-activity, granular activated carbon with a high surface area and broad pore size distribution. It has a CAS Registry Number of 7440-44-0. Some typical properties of this material may include an average particle size of 6×18 (U.S. Mesh) or 8×25 (U.S. Mesh), an apparent density of 240-300 kg/m$^3$ and a surface are of 1400-1600 m$^2$/g (as measured by the nitrogen BET method).

The adsorbent polymer may be insoluble in strong acid, strong base or organic solvents. It may have a high surface area. It may have a particle size ranging from 20-50 mesh. The adsorbent polymer may be a highly cross-linked polymer. The adsorbent polymer may be a styrenic polymer. The adsorbent polymer may be a styrene-divinylbenzene polymer. The adsorbent polymer may be a styrene-divinylbenzene macroporous polymer.

The adsorbent polymer may, for example, comprise DOWEX OPTIPORE®, a material produced by the Dow Chemical Company. DOWEX OPTIPORE® is a highly cross-linked styrenic polymer that is insoluble in strong acid, strong base or organic solvents. It has a high surface area and a unique pore size distribution. Its total pore volume is 1.16 cc/g, and its BET surface area is 1100 m$^2$/g. DOWEX OPTIPORE® has a particle size ranging from 20-50 mesh. It has an apparent density of 0.62 g/cc and an average pore diameter of 46 Å. It has a CAS Registry Number of 69011-14-9.

The act of passing acidified stream 35 through vessel 60 comprising media 65 may result in the removal of organic species and other contaminants from acidified stream 35 to produce polished stream 70. Various flow rates may be used in passing acidified stream 35 through vessel 60 comprising media 65. For example, the flow rate may be from about 1 m$^3$/hr to about 4 m$^3$/hr. Vessel 60 may be operated either with upward- or downward flowing fluids. For downward flowing devices the fluid may flow under pressure or by gravity alone.

While FIG. 1 shows single vessel 60 comprising media 65, multiple vessels 60 may be connected in series or in parallel to desorb organic species and other contaminants from acidified stream 35 and produce polished or treated stream 70.

Additionally, an apparatus comprising a filter (not shown in FIG. 1) may be included upstream or downstream of vessel 60 comprising adsorbent media 65 to remove contaminants, such as free oils, carried by acidified stream 35, prior to acidified stream 35 being delivered to vessel 60 comprising media 65. In such a configuration, the subsequent GAC columns may have less loading of oil and solids, reducing regeneration frequency and/or increasing COD reduction. The regeneration system for the filter may require only fluid (for example, raw spent caustic feed, acidified spent caustic stream, or polished stream and air) for backwashing. The filter may comprise a walnut shell filter.

After exiting vessel 60 comprising media 65, polished stream 70, having a reduced COD, may then be in condition to be directed for further biological treatment 75. Biological treatment 75 may comprise one or more unit operations. Biological treatment 75 may comprise, for example, pollutant decomposition and oxidation through bacterial adsorption, respiration and synthesis mechanisms. It may include additional bacterial cells, followed by clarification and stabilization. Prior to biological treatment 75, pH adjustment may optionally take place in pH treatment zone 67 to produce neutralized polished stream 75 for biological treatment 75. The pH adjustment may take place by introducing basic material to polished stream 70 either inline or in a mixing tank. Neutralized polished stream 72 may have a pH of about 6 to 9. In some embodiments, pH neutralization may not be required.

Eventually, after a certain volume of acidified stream 35 passes through media 65, the efficacy of media 65 to remove organic species and other contaminants from acidified stream 35 may be reduced. As a result the effluent from vessel 60 may have a higher COD than desired. The reduced efficacy of media 65 to remove organic species and other contaminants may result from the fact that adsorption sites on media 65 are already occupied by organic species and other contaminants. Therefore, it may be desirable to desorb the organic species from media 65 to regenerate media 65. Periodic regeneration of media 65 may be required.

In the embodiment disclosed in FIG. 1, media 65 may be regenerated while positioned in vessel 65. As stated above, the feed lines associated with the regeneration stage of the system 1 are indicated by dashed lines.

During a regeneration stage, second portion 15 of the spent caustic stream may be diverted to vessel 60 comprising media 65. The spent caustic may pass through media 65 and, in the process, remove or desorb organic species from media 65. The spent caustic stream further comprising the desorbed organics may then exit vessel 60 and follow regeneration waste line 80, where it may be ultimately directed back to mixing tank 30 or a point upstream or downstream of mixing tank 30. The surplus of desorbed organic species may subsequently be removed from system 1 in the oil layer created during acidification in mixing tank 30. The amount of spent caustic 15 utilized in regeneration may vary according to the needs and conditions of the particular system as would be understood by a person of ordinary skill in the art equipped with the teachings of this disclosure. The amount of spent caustic 15 required for a regeneration phase may be as low as about one to about two bed volumes. A bed volume may be understood as a volume equivalent to the volume of adsorbent media 65 in vessel 60. Although the regeneration stream is depicted as moving in a direction opposite the direction of the stream being treated, the regeneration stream may also be allowed to flow in the same direction or other direction of the stream being treated.

Once the introduction of spent caustic 15 to regenerate media 65 is complete, rinse water (not shown) may be passed through vessel 60 comprising media 65 to remove any non-acidified spent caustic (that may contain high COD), prior to reinitiating the treatment of acidified stream 35 in vessel 60. The rinse water may comprise treated effluent or be supplied from some other source. By flushing vessel 60 with rinse water after regeneration, the opportunity for high-COD raw spent caustic to enter feed line 70 may be reduced. The amount of rinse following spent caustic 15 may also vary according to the needs and conditions of the particular system as would be understood by a person of ordinary skill in the art equipped with the teaching of this disclosure. The amount of rinse required after spent caustic regeneration may be as low as one to two bed volumes.

Transfer to a regeneration stage may be triggered by, for example, the polished stream falling below a set point, falling outside of a predetermined range of values of a measured parameter of the system, achieving a predetermined pressure drop across the filter bed, or passage of a pre-set time for the treatment stage. A control system (not shown) may control the transfer to and from a regeneration stage. The control system may be in communication with a sensor (not shown) or series of sensors positioned to gather data utilized by the control system. For example, a sensor may be positioned downstream of vessel 60 and configured to measure the COD of treated polished stream 70. If the sensor measures a value that is either outside a predetermined range of values of chemical oxygen demand or above a predetermined set point for chemical oxygen demand, the control system may be configured to initiate a regeneration of the adsorbent media. The predetermined range of values for COD may be about 1,000 mg/l to about 5,000 mg/l. The control system may control the opening and closing of various optional valves within the system to facilitate the transfer to and from a regeneration stage.

In this manner, operation of system 1 may alternate between a treatment stage, in which acidified stream 35 may be passed through vessel 60 comprising adsorbent media 65 to produce polished stream 70; and a regeneration stage, in which second portion of spent caustic stream 15 may be passed through vessel 60 to desorb organic species and other contaminants and thereby regenerate media 65.

Figure 2:
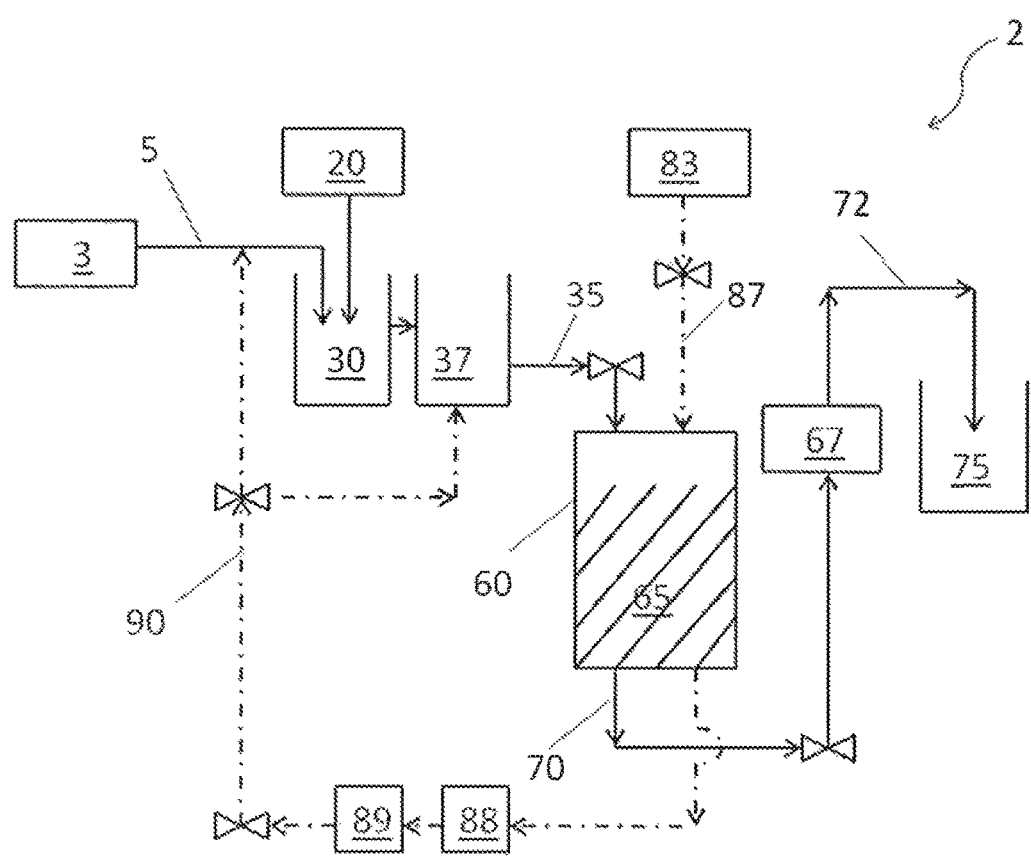
FIG. 2 presents a schematic of a spent caustic treatment system in accordance with one or more embodiments of the disclosure.

Referring to FIG. 2, a schematic is presented of spent caustic treatment system 2 in accordance with one or more embodiments of the disclosure. The solid lines indicate feed lines and streams associated with the treatment of spent caustic. The dashed lines indicate feed lines and streams associated with the regeneration of filters and media utilized in the treatment of spent caustic.

The operation of system 2 in the spent caustic treatment stage may be similar to that of system 1 described in FIG. 1. Source of spent caustic 3 may be provided by, for example, connecting source 3 to feed line 5. Spent caustic stream 5 may then be directed to mixing tank 30, where it may be mixed with an acid from source of acid 20 and then introduced to separator or separation zone 37 to provide acidified stream 35. Alternatively, in certain embodiments, the separation may take place in the same tank in which the acid was introduced and/or mixed. Acidified stream 35 may then pass through vessel 60 comprising adsorbent media 65, where organic species may be removed from the stream by adsorbing onto media 65. Polished stream 70, with a reduced COD, may then be directed to further biological treatment 75, after pH neutralization stage 67 produces neutralized polished stream 72. Additional descriptions of the spent caustic treatment stage described in reference to FIG. 1 may apply to system 2 shown in FIG. 2.

In the operation of the regeneration stage, system 2 of FIG. 2 may differ from system 1 of FIG. 1. In system 2, media 65 may be regenerated by utilizing steam to desorb the organic materials from media 65. Source of steam 83 may pass through feed line 87 and enter vessel 60. The steam may comprise low pressure steam. The steam may have a pressure in the range of about 30 psi to about 100 psi. As the steam passes through media 65, organic species and other contaminants may be removed from media 65 and pass out of vessel 60 with the fluid as it exits through regeneration waste line 90. Stream 90 with the desorbed organics and other contaminants will then be ultimately returned to mixing tank 30, or, alternatively, delivered directly to separation tank 37. In certain embodiments, condenser 88 may be placed along feed line 90 to condense the steam effluent. In certain embodiments, phase separator 89 may be placed along line 90 following condenser 88. In phase separator 89, different phases of the condensate may separate out according to the different constituents of waste stream 90. For example, at least a portion of an oils layer may be separated from the condensate in phase separator 89. The oils layer may comprise naphthenic acids and other unwanted species contributing to the COD of effluent 90. While shown separately, in some embodiments condenser 88 and phase separator 89 may be combined into a single unit. The amount of steam 83 utilized in regeneration may vary according to the needs and conditions of the particular system. The amount of steam required for a regeneration phase may be as low as about one to about two bed volumes. Although the regeneration stream is depicted as moving in a direction that is the same as the direction of the stream being treated, the regeneration stream may also be allowed to flow in the opposite direction or other direction of the stream being treated.

In certain embodiments, at least a portion of regeneration effluent 90 may, alternatively, be directed to further treatment stages, rather than recycled back through system 2 as shown in FIG. 2. These additional regeneration effluent treatment processes are above.

Figure 3:
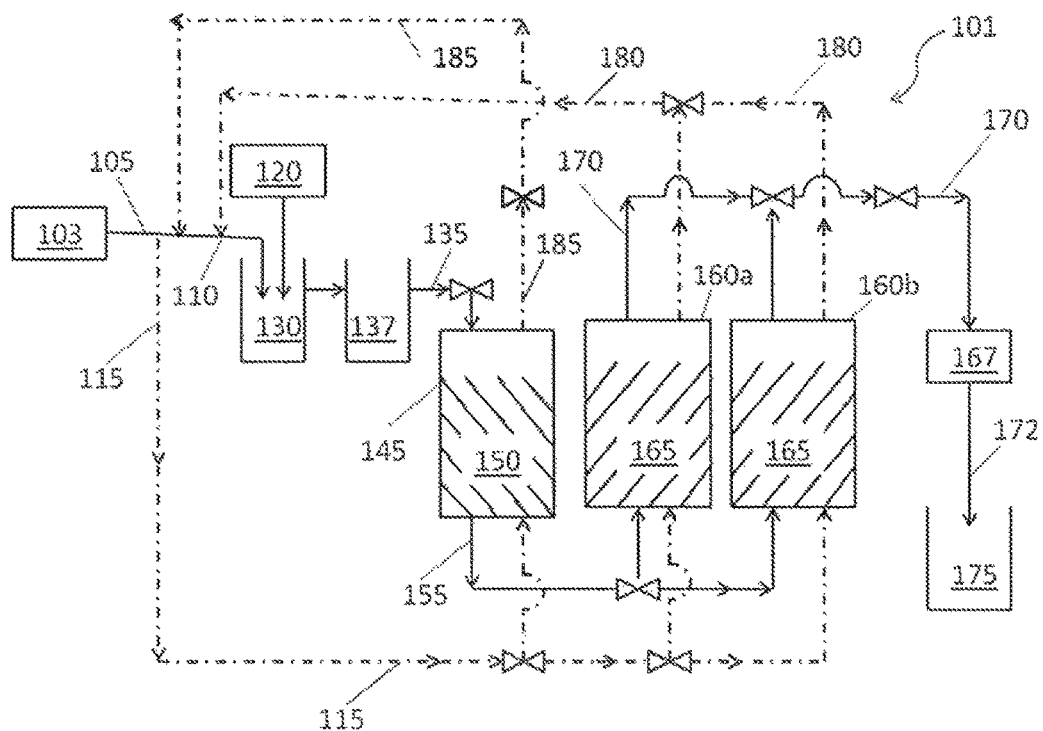
FIG. 3 presents a schematic of a spent caustic treatment system in accordance with one or more embodiments of the disclosure.

Referring to FIG. 3, a schematic is presented of spent caustic treatment system 101 in accordance with one or more embodiments of the disclosure. The solid lines indicate feed lines and streams associated with the treatment of spent caustic. The dashed lines indicate feed lines and streams associated with the regeneration of filters and media utilized in the treatment of spent caustic.

Source of spent caustic 103 may be provided. Providing source of spent caustic 103 may comprise connecting source of spent caustic 103 to feed line 105 for treatment.

As part of the treatment process, spent caustic stream 105 may be divided into portions. First portion 110 of the spent caustic may be treated to reduce its pH and thereby produce acidified stream 135. The reduction of the pH of first portion 110 of the spent caustic may be accomplished by directing first portion 110 of the spent caustic to mixing tank 130, where an acid from source of acid 120 may also be introduced to mixing tank 130. Source of acid 120 may comprise an aqueous acid. Source of acid 120 may comprise sulfuric acid. Alternatively, source of acid 120 may comprise hydrochloric acid, phosphoric acid and the like. An acid from source of acid 120 may be introduced in an amount sufficient to react with the sodium contained in the caustic stream. An acid from source of acid 120 may be introduced in an amount sufficient to reduce the pH of the system. An acid from source of acid 120 may be introduced in an amount sufficient to reduce the pH of the system to a pH of less than 7. An acid from source of acid 120 may be introduced in an amount sufficient to reduce the pH of the system to a range of about 2 to about 3. An acid from source of acid 120 may be introduced in an amount sufficient to reduce the pH of the system to a range of about 1 to about 3.

First portion 110 of the caustic stream and source of acid 120 may be thoroughly mixed in mixing tank 130. The mixture may be allowed to separate, for example, through settling, into distinct layers in separator 137 or separation zone. Alternatively, in certain embodiments, the separation may take place in tank 137 in which the acid was introduced and/or mixed. The distinct layers may comprise a bottoms layer, that is, a solids layer; a brine layer, or aqueous layer; and an oils layer. The bottoms layer and the oils layer, which may lie below and above the brine layer, respectively, may be separated out and directed to separate outlets (not shown in FIG. 3). Separator or separation zone 137 may comprise any of a variety of separation apparatuses known to a person of ordinary skill in the art. Separation zone 137 may, for example, allow for separation by gravitational settling into different layers, followed by directing the different layers to different outlets of the settling tank.

The brine layer may be directed toward further treatment as acidified stream 135. While the system is operating in a spent caustic treatment stage, the optional valve shown along feed line 135 may be in an open position, directing acidified stream 135 into apparatus 145 comprising filter 150. Filter 150 may be any filter that allows for adsorption of organic species and other contaminants found in oils. Filter 150 may remove from about 10% to about 50% of a stream's COD content. Filter 150 may be a walnut shell filter. Filter 150 may remove contaminants, such as free oils, carried by acidified stream 135. After passing through filter 150, acidified stream 155 may have less loading of oil and solids.

Acidified stream 155 may then be directed to vessels 160a and 160b comprising media 165. Media 165 present in vessels 160a and 160b may function to adsorb organic species and other contaminants from acidified stream 155. Vessels 160a and 160b may comprise one or more types of adsorbent media 165. Media 165 may form a fixed bed. Media 165 may comprise activated carbon. Media 165 may comprise granular activated carbon (GAC). Media 165 may comprise polymeric adsorbent. Certain characteristics of GAC and polymeric adsorbent have been discussed above.

In certain embodiments, the adsorbent media used in vessels 160a and 160b is the same adsorbent media. In other embodiments, the adsorbent media used in vessel 160a is different from the adsorbent media used in vessel 160b. In certain other embodiments, vessel 160a and vessel 160b may have the same adsorbent media, but in different amounts. In other embodiments, vessel 160a and vessel 160b may have the same adsorbent media, but may be used in combination with one or more other types of adsorbent media. Vessel 160a and vessel 160b may have the same or different percentages of a particular type of adsorbent media.

FIG. 3 presents two vessels 160a and 160b comprising media 165. In one mode of operation for this embodiment, the optional valves of the system are configured so that vessel 160a is operating in a treatment or online, mode, while vessel 160b is operating in a regeneration or offline mode. In such a mode of operation, feeding, or introducing, acidified stream 155 to first vessel 160a and feeding, or introducing, second portion 115 of the spent caustic stream to second vessel 160b may occur simultaneously.

The act of passing acidified stream 155 through vessels 160a and 160b comprising media 165 may result in the removal of organic species and other contaminants from acidified stream 155 to produce polished or treated stream 170.

After exiting vessel 160a and/or vessel 160b comprising media 165, polished or treated stream 170, or a portion thereof, may then be in condition to be directed for further biological treatment 175. Prior to biological treatment 175, pH adjustment 167 may optionally take place to prepare neutralized polished stream 172 for biological treatment 175.

After a certain volume of acidified stream 155 passes through media 165, the efficacy of media 165 to remove organic species from acidified stream 155 may be reduced. As a result the effluent from vessel 160a and/or vessel 160b may have a higher COD than desired. The reduced efficacy of media 165 to remove organic species may result from the fact that adsorption sites on media 165 are already occupied by organic species and other contaminants. Therefore, it may be desirable to desorb the organic species from media 165 to regenerate media 165. Periodic regeneration of media 165 may be required.

When regeneration of the vessel 160a is required, the optional valves of the system may be reconfigured to redirect acidified stream 155 to vessel 160b. In this manner, interruption of the polishing of acidified stream 155 may be minimized.

Regeneration of media 165 by spent caustic, according to the embodiment disclosed in FIG. 3, may operate according to similar principles as those discussed in relation to FIG. 1. Although the regeneration stream is depicted as moving in a direction that is the same as the direction of the stream being treated, the regeneration stream may also be allowed to flow in the opposite direction or other direction of the stream being treated.

The regeneration system for walnut shell filter 150 may require fluid used for backwashing. In the embodiment disclosed in FIG. 3, the source of fluid may be portion 115 of the spent caustic stream. Alternatively, the source of fluid may be polished stream 170 or acidified stream 155. Backwash effluent 185 may then be ultimately directed back to mixing tank 130, upstream or downstream of mixing tank 130, or separator 137.

In certain embodiments, regeneration effluent 180 or filter backwash effluent 185 may, alternatively, be directed to further treatment stages, rather than recycled back through system 101 as shown in FIG. 3. These additional regeneration effluent treatment processes are discussed above and may be used with one or more of any of the embodiments discussed herein Referring to FIG. 4, a schematic is presented of spent caustic treatment system 102 in accordance with one or more embodiments of the disclosure. The solid lines indicate feed lines and streams associated with the treatment of spent caustic. The dashed lines indicate feed lines and streams associated with the regeneration of filters and media utilized in the treatment of spent caustic.

The operation of system 102 in the spent caustic treatment stage may be similar to that of system 101 described in FIG. 3. Source of spent caustic 103 may be provided by connecting source 103 to feed line 105. Spent caustic stream 105 may then be directed to mixing tank 130, where it may be mixed with source of acid 120 to provide acidified stream 135, further produced through a separations process, for example, settling, in separator 137 or separation zone. Alternatively, in certain embodiments, the separation may take place in the tank 130 in which the acid was introduced and/or mixed. Acidified stream 135 may then pass through apparatus 145 comprising walnut shell filter 150, to remove some contaminants and lower the COD of acidified stream 135. Acidified stream 155 exiting filter apparatus 145 may then further pass through vessel 160a and/or vessel 160b comprising adsorbent media 165, where organic species and other contaminants may be removed from the stream by adsorbing onto media 165. Polished stream 170, with a reduced COD, may then be directed to further biological treatment 175, after pH neutralization in zone 167 to produce neutralized polished stream 172. Additional descriptions of the spent caustic treatment stage described in reference to previous figures apply to system 102, shown in FIG. 4.

Figure 4:
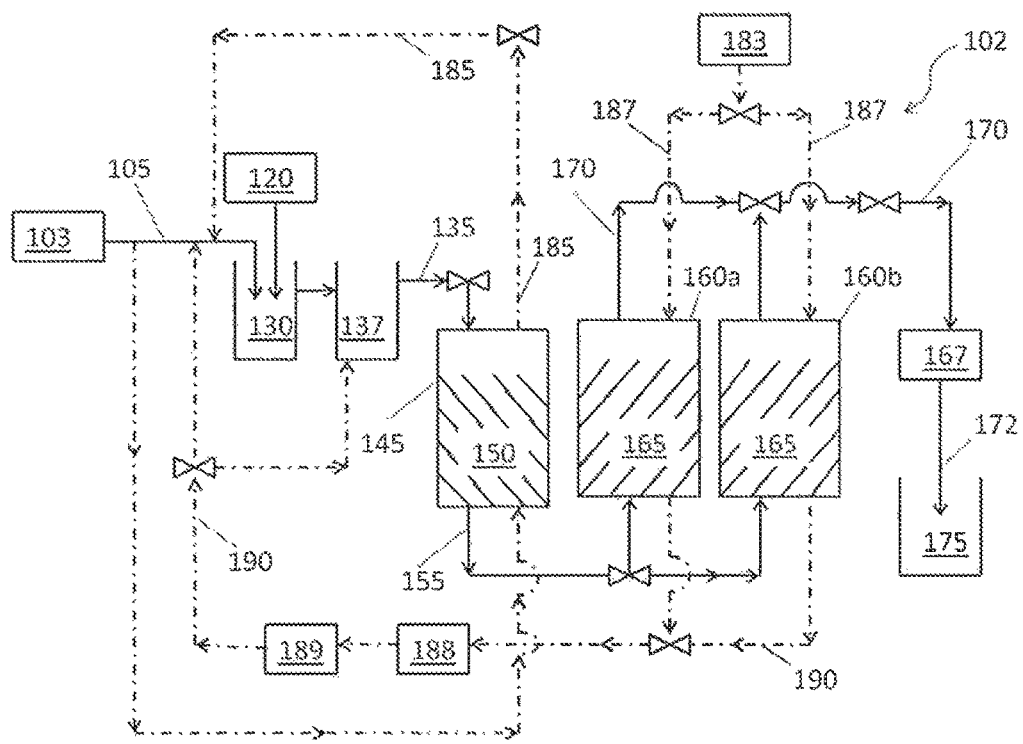
FIG. 4 presents a schematic of a spent caustic treatment system in accordance with one or more embodiments of the disclosure.

Similar to the discussion of FIG. 3, the embodiment presented in FIG. 4 may be operated so that while vessel 160a comprising media 165 is treating the acidified stream 155, vessel 160b comprising media 165 is being regenerated. Likewise, while vessel 160b is treating acidified stream 155, vessel 160a may be regenerated.

It is in the operation of the regeneration stage that system 102 of FIG. 4, which may utilize steam to regenerate media 165, differs from system 101 of FIG. 3, which may utilize spent caustic to regenerate media 165. Furthermore, it is in the operation of the regeneration stage that system 102 of FIG. 4 may operate similarly to the embodiment described with reference to FIG. 2, which also may use steam to regenerate media. In system 102, the media 165 may be regenerated by utilizing steam 183 to desorb the organic materials and other contaminants from media 165. Source of steam 183 may pass through feed line 187 and enter vessel 160a or vessel 160b. The steam may comprise low pressure steam. The steam may have a pressure in the range of about 30 psi to about 100 psi. As the steam passes through media 165, organic materials and other contaminants may be removed from media 165 and pass out of vessel 160 with the fluid as it exits through feed line 190. Stream 190 with the desorbed organics and contaminants will then be ultimately returned to mixing tank 130, or upstream or downstream of mixing tank 130, or separator 137. In certain embodiments, condenser 188 may be placed along feed line 190 to condense the steam effluent. In certain embodiments, phase separator 189 may be placed along line 190 following condenser 188. In phase separator 189, different phases of the condensate may separate out according to the different constituents of waste stream 190. While shown separately, in some embodiments condenser 188 and phase separator 189 may be combined into a single unit.

Although the regeneration stream is depicted as moving in a direction opposite the direction of the stream being treated, the regeneration stream may also be allowed to flow in the same direction or other direction of the stream being treated.

In certain embodiments, regeneration effluent 190 or filter backwash effluent 185 may, alternatively, be directed to further treatment stages (not shown), rather than recycled back through system 102 as shown in FIG. 4. These additional regeneration effluent treatment processes are discussed above and may be used with one or more of any of the embodiments discussed herein.

Figure 5:
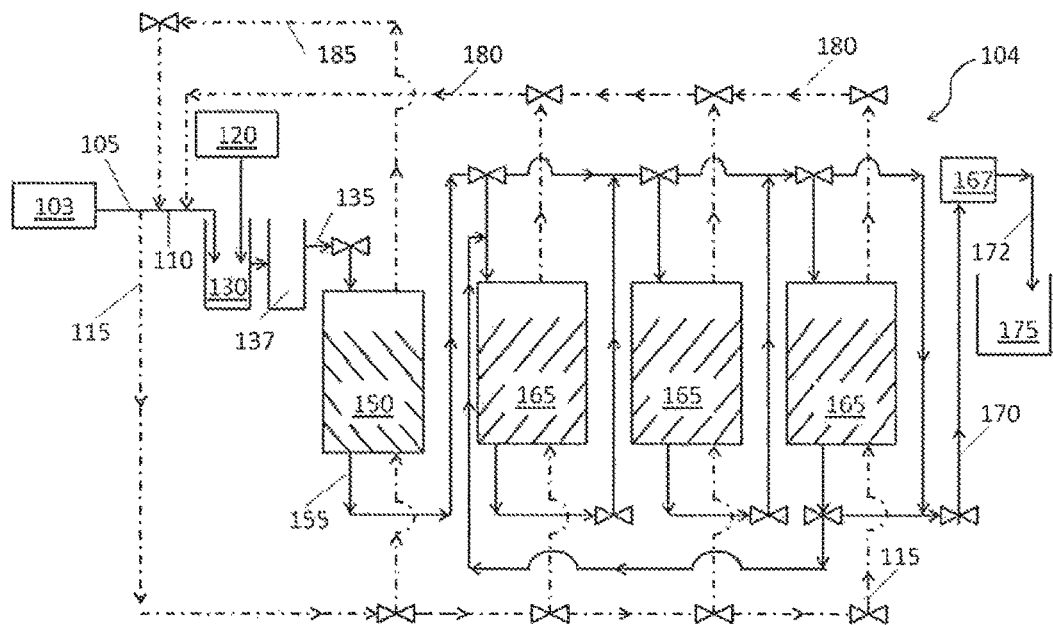
FIG. 5 presents a schematic of a spent caustic treatment system in accordance with one or more embodiments of the disclosure.

Referring to FIG. 5, a schematic is presented of spent caustic treatment system 104 in accordance with one or more embodiments of the disclosure. The solid lines indicate feed lines and streams associated with the treatment of spent caustic. The dashed lines indicate feed lines and streams associated with the regeneration of filters and media utilized in the treatment of spent caustic.

In this embodiment there may be two vessels comprising media 165 arranged in series with another vessel offline. Of the two online vessels arranged in series, the lead vessel may have a high loading and the lag vessel may provide additional polishing. When the lead vessel would become spent, the positioning of the optional valves may be reconfigured to take the lead vessel offline for regeneration. The lag column may then become the lead column, and the offline column may become the lag column System 104 may be cycled through these different configurations as each lead vessel becomes spent.

Regeneration may take place by introducing a portion of spent caustic stream 115 to media 165, as shown in FIG. 5. Alternatively, regeneration may occur with the use of steam as described above in reference to FIGS. 2 and 4.

In certain embodiments, regeneration effluent 180 or filter backwash effluent 185 may, alternatively, be directed to further treatment stages (not shown), rather than recycled back through system 104 as shown in FIG. 5. These additional regeneration effluent treatment processes are discussed above in relation to FIG. 2, but may be used with one or more of any of the embodiments discussed herein.

In certain embodiments a method for treating a spent caustic stream is provided. The method may comprise providing a source of the spent caustic stream. An example of such providing may include fluidly connecting a spent caustic treatment system to a source of spent caustic.

The method may further comprise reducing a pH of a first portion of the spent caustic stream to provide an acidified stream. The method may further comprise introducing the acidified stream to a first inlet of a first vessel comprising adsorbent media to provide a polished stream. The method may further comprise introducing a second portion of the spent caustic stream to a second inlet of the first vessel to regenerate the adsorbent media in the first vessel. In some embodiments, the first and second inlets of the vessel are the same inlet. These steps have been discussed above in the descriptions of FIGS. 1-5.

The step of reducing the pH of the first portion of the spent caustic stream to provide the acidified stream may further comprise introducing the first portion of the spent caustic stream to a separation zone, or separator, after reducing the pH. The separation may comprise settling.

The method may further comprise introducing the acidified stream to an inlet of a walnut shell filter apparatus prior to introducing the acidified stream to the first inlet of the first vessel comprising adsorbent media. The method may further comprise introducing a third portion of the spent caustic stream to a second inlet of the walnut shell filter apparatus; and regenerating the walnut shell filter apparatus with the third portion of the spent caustic stream.

The method may further comprise ceasing introduction of the acidified stream to the first inlet of the first vessel prior to introducing the second portion of the spent caustic stream to the second inlet of the first vessel.

The method may further comprise introducing the acidified stream to a first inlet of a second vessel comprising the adsorbent media, wherein introducing the acidified stream to the second vessel and introducing the second portion of the spent caustic stream to the first vessel occur simultaneously. For example, the acidified stream may be passing through the second vessel in a treatment phase, while spent caustic is passing through the first vessel in a regeneration phase. The introduction of streams need not begin in both vessels simultaneously. Rather, introduction should be understood as an ongoing process lasting as long as stream is passing through a vessel. Therefore, there may be simultaneous introduction where there is some overlap in time of the spent caustic stream passing through the first vessel and the acidified stream passing through the second vessel.

The method may further comprise introducing the second portion of the spent caustic stream to a second inlet of the second vessel to regenerate the adsorbent media in the second vessel, wherein introducing the second portion of the spent caustic stream to the second vessel and introducing the acidified stream to the first vessel occur simultaneously. An understanding of simultaneous introduction, as described above, may apply to this step, as well.

The step of reducing the pH of the first portion of the spent caustic stream may comprise reducing the pH to less than about 7. It may comprise reducing the pH to a range of about 2 to about 3.

The step of introducing the acidified stream may comprise passing the acidified stream through the first vessel comprising adsorbent media at a flow rate in a range of about 1 $m^3$/hr to about 4 $m^3$/hr.

The adsorbent media may comprise a material capable of adsorbing contaminants, such as organic species, from the acidified stream. The adsorbent media may comprise at least one of granular activated carbon and a polymeric adsorbent.

The chemical oxygen demand (COD) of the polished stream may be low enough to allow for biological treatment. This value may be dependent upon the attributes of a particular treatment plant. Some treatment plants may require a COD of less than 2000 mg/l. The COD of the polished stream may be less than about 2000 mg/l. The COD of the polished stream may be less than about 1000 mg/l. The COD of the polished stream may be less than about 100 mg/l.

The step of introducing the second portion of the spent caustic stream to the second inlet of the first vessel to regenerate the adsorbent media in the first vessel may comprises regenerating the adsorbent media to at least 80% of a virgin adsorption capacity of the adsorbent media. The adsorbent media may be regenerated to at least 90% of a virgin adsorption capacity of the adsorbent media. The adsorbent media may be regenerated to at least 95% of a virgin adsorption capacity of the adsorbent media. The adsorbent media may be regenerated to at least 99% of a virgin adsorption capacity of the adsorbent media. Virgin media may be understood to be media that has not yet been introduced to a spent caustic treatment system. Adsorption capacity may be understood to be the amount of total organic loading a media bed is capable of between regeneration steps.

In certain further embodiments a method for treating a spent caustic stream is provided. The method may comprise reducing a pH of the spent caustic stream to produce a reduced pH spent caustic stream. The method may further comprise introducing the reduced pH spent caustic stream to a separation zone to produce an acidified stream. The method may further comprise adsorbing organic compounds from the acidified stream onto adsorbent media positioned in a vessel to provide a treated stream. The method may further comprise measuring a chemical oxygen demand of the treated stream. The method may further comprise desorbing organic compounds from the adsorbent media positioned in the vessel, when the chemical oxygen demand of the treated stream is greater than 2000 mg/l. The method may further comprise introducing the treated stream to a biological treatment process. The adsorbent media may comprise at least one of granular activated carbon and a polymeric adsorbent. The step of desorbing may comprise passing a portion of the spent caustic stream through the adsorbent media positioned in the vessel. The step of desorbing may comprise passing steam, for example, low pressure steam, through the adsorbent media positioned in the vessel to produce a regeneration effluent. The steam may have a pressure in the range of about 30 psi to about 100 psi. The method may further comprise treating the regeneration effluent to remove at least a portion of an unwanted species comprising at least one of phenolic or cresylic compounds.

In certain embodiments a method of facilitating regeneration of adsorbent media in a spent caustic treatment system is provided. The system may comprise a mixing tank fluidly connected to a source of acid and a source of spent caustic, an inlet of a separation zone fluidly connected to an outlet of the mixing tank, and a first inlet of a vessel comprising adsorbent media fluidly connected to an outlet of the separation zone. The method of facilitating may comprise connecting a second inlet of the vessel comprising adsorbent media to the source of spent caustic. The method may further comprise closing the first inlet of the vessel, prior to opening the second inlet of the vessel. The method may further comprise closing the second inlet of the vessel, prior to opening the first inlet of the vessel. The adsorbent media may comprise at least one of granular activated carbon and a polymeric adsorbent. The spent caustic treatment system may further comprise a walnut shell filter apparatus fluidly connected to and downstream of the outlet of the mixing tank and fluidly connected to and upstream of the first inlet of the vessel comprising adsorbent media.

In certain embodiments, the untreated or raw spent caustic may have a chemical oxygen demand and one or more of the following compounds selected from the group consisting of phenols and naphthenic acids, and may also comprise a particular concentration or range of concentrations of dissolved solids. The untreated or raw spent caustic may have a chemical oxygen demand of about 30,000 to about 250,000 mg/l. The untreated spent caustic may have a phenols concentration of about 300 to about 10,000 mg/l. The untreated spent caustic may have a naphthenic acids concentration of about 10,000 to about 100,000 mg/l. The untreated spent caustic stream may have a total dissolved solids (TDS) concentration of about 20,000 to about 60,000 mg/l. The untreated spent caustic may have a pH of about 12 or greater.

After acidification, the remaining acidified stream may have a chemical oxygen demand in the range of about 5,000 to about 25,000 mg/L. The acidified stream may have a phenols concentration of about 300 to about 5,000 mg/l. The acidified stream may have a naphthenic acids concentration of about 250 to about 5,000 mg/l. The acidified stream may have a TDS concentration of about 40,000 to about 180,000 mg/l. The acidified stream may have a pH of about 7 or less. In certain embodiments the acidified stream may have a pH of about 2 to about 3.

After passage through a filter, for example, a walnut shell filter, the filtered stream may have a COD of about 3,000 to about 20,000 mg/L. The filtered stream may have a phenols concentration of about 300 to about 5,000 mg/l. The filtered stream may have a naphthenic acids concentration of about 250 to about 4,000 mg/l. The filtered stream may have a TDS concentration of about 40,000 to about 80,000 mg/l. The filtered stream may have about the same pH as that of the acidified stream.

After passage through adsorbent media, for example, GAC or polymeric adsorbent, the polished stream may have a COD of about 10 to about 3,000 mg/L. The polished stream may have a phenols concentration of about 10 to about 1,000 mg/l. The polished stream may have a naphthenic acids concentration of about 10 to about 1,000 mg/l. The polished stream may have a TDS concentration of about 40,000 to about 180,000 mg/l. The polished stream may have about the same pH as that of the acidified stream. A pH neutralization may take place downstream of the media, prior to biological treatment, and may produce a neutralized polished stream with a pH of about 6 to about 9.

The media polishing may effectively remove at least one of phenols and naphthenic acids, or other species that may complicate downstream biological treatment. The feed COD and required COD reduction may be site dependent or dependent on federal or national, state, or municipal regulations. An about 2,000 mg/L COD discharge limit for wastewater going to the biological treatment plant limit may be required at some sites.

EXAMPLES

Example 1

Testing of a laboratory scale system was performed. An acidified stream was fed to a single 65 mL column containing granular activated carbon (GAC) media. The GAC was wood-based NUCHAR® WV-B. The acidified spent caustic was acidified with concentrated sulfuric acid to a pH of about 2.8-3.0. Acid oils were removed after a 4 hour settling in a separatory funnel. In some cases, the initial COD was slightly higher since the raw spent caustic from a previous regeneration was used. A peristaltic pump was set to deliver 5 mL/min of spent caustic to the column for about a 12 minute contact time per column GAC bed flow rates may be based on a 15-30 minute contact time. Forward flow was down flow and regeneration was up flow.

The tests were performed with a 25 bed volume forward flow, considered an approximate breakthrough volume for these conditions, followed by regeneration. Breakthrough refers to the transition where the efficacy of the media becomes markedly reduced, as shown by the reduction in quality of the effluent. Regeneration was performed by pumping caustic at a flow rate of about 5 mL/min up through the bed, followed by a water rinse. Periodic samples were taken of the effluent to monitor the performance during both forward flow and regeneration.

Even though 20 grams of media was used for most tests, the void space varied, resulting in a different bed volume and contact time. The bed volume was considered 65 mL; however, some variation may have occurred.

The regeneration following Run 1 used fresh NaOH, but the later regenerations used raw spent caustic. It appeared that after several regenerations, the single GAC column did not diminish in performance.

Figure 6:
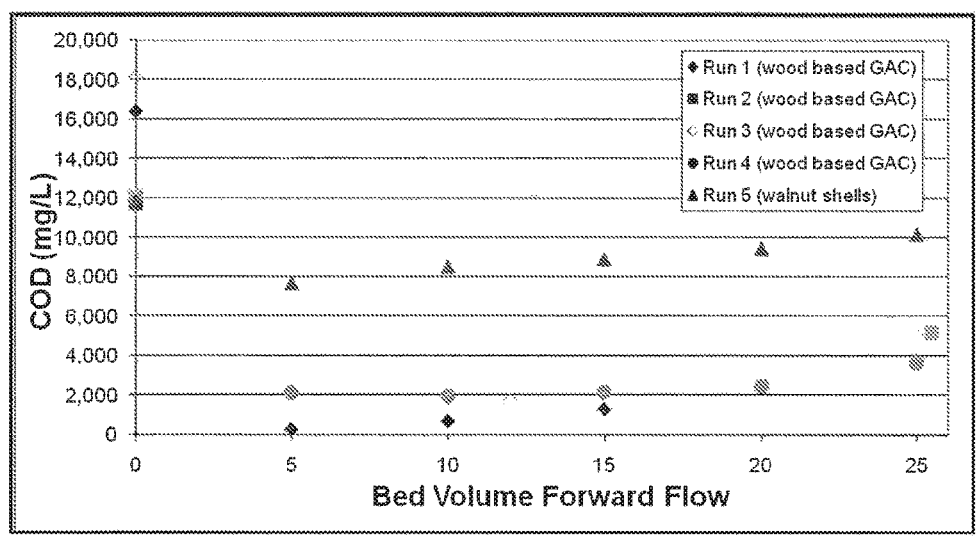
FIG. 6 presents feed and effluent COD during operation with a single column.

FIG. 6 presents feed and effluent COD during operation with single column lab testing. It was determined that the COD of the effluent increased around 25 bed volumes as shown in FIG. 6, in which the bed was considered spent for this series of testing. The $25^{th}$ bed volume had a COD reduction of about 57-77% when wood based GAC was used. Even though the feed COD varied, it was not apparent that the effluent COD was significantly affected. A lead-lag configuration, similar to that presented in FIG. 5, may enable further COD reduction when the lead column becomes spent.

A walnut shell filter, instead of GAC, was used to reduce the COD in Run 5. The walnut shells were 20/30 mesh. It was thought that there may be some residual free oils in the brine. The walnut shells initially removed about 35% of the COD of the effluent, but by the 25th bed volume the walnut shells only removed about 14% of COD of the effluent. It may be expected that performance of the walnut shells would perform better after additional cycles since seasoned walnut shells typically work better. The walnut shells were backwashed by removing the shells from the column, stirring the shells in water to remove the oil, and returning the shells to the column.

A 15 bed volume raw spent caustic regeneration followed by a three bed volume water rinse was used for Runs 2, 3, and 4. The final water rinse COD was equivalent to the feed COD, which was considered acceptable for service. It appeared that the raw spent caustic washes were effective for regeneration.

Example 2

Testing of a laboratory scale system was performed as described in Example 1. Tests were performed at elevated temperature to determine if performance was affected by placing the column in a hot water bath. In the field, the spent caustic would typically be about 50° C.

Figure 7:
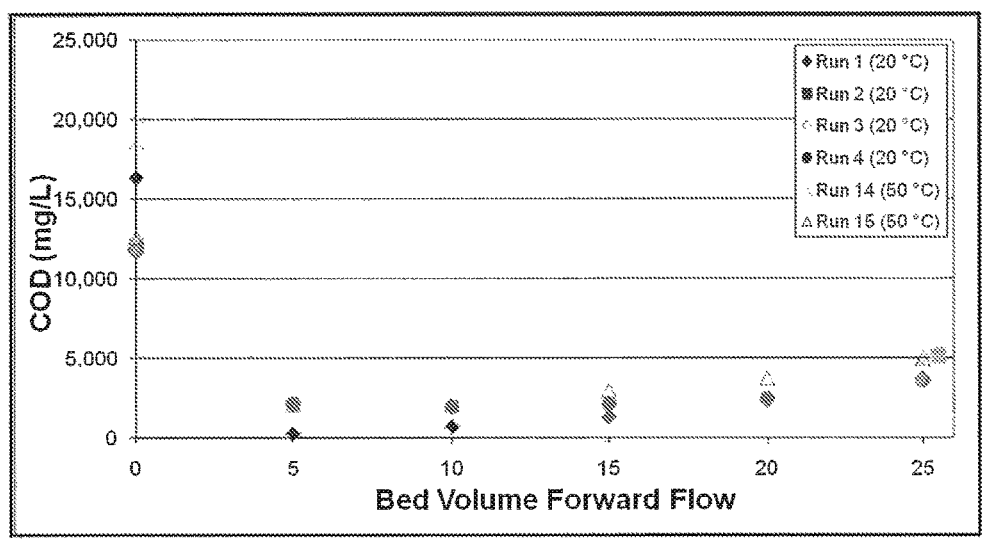
FIG. 7 presents feed and effluent COD during operation at 20 and 50° C. in a single column with GAC media.

FIG. 7 presents feed and effluent COD during operation at 20° C. and 50° C. in a single column with GAC media. As shown in FIG. 7, the wood based GAC did not appear to be affected by temperature. Run 14 was performed at a slightly higher flow rate resulting in a shorter contact time while the initial COD was also higher. Run 15, the subsequent test with the correct flow rate, yielded similar results to tests performed at room temperature.

Example 3

Testing of a laboratory scale system was performed as described in Example 1. An acidified stream was fed to a single 65 mL column containing GAC media. Several different GAC media were tested to determine if one GAC had a better performance. The GAC types tested were coconut, wood, lignite, petroleum bead, and bituminous based as shown in Table 1. The wood- and petroleum-based GAC performed best. However, the wood-based GAC achieved its results with less GAC by weight than the petroleum bead GAC.

TABLE 1

Summary of GAC types and performance in single column testing.

| GAC Type | Name | Amount | $25^{th}$ Bed Volume COD of Effluent (mg/L) | $25^{th}$ Bed Volume COD Reduction |
|---|---|---|---|---|
| Wood | NUCHAR ® WV-B | 20 g/65 mL | 3,636 | 69% |
| Coconut | ACRS 830 | 20 g/45 mL | 9,200 | 32% |
| Petroleum bead | Kureha G-BAC G70 R | 20 g/40 mL | >6,000 | <60% |
|  |  | 35 g/65 mL | 4,630 | 74% |
| Lignite | Norit PETRODARCO ® 8 × 30 | 20 g/45 mL | >6,000 | <60% |
| Bituminous | Calgon F400 | 20 g/45 mL | 7,780 | 44% |
|  |  | 33 g/65 mL | 10,940 | 38% |

Figure 8:
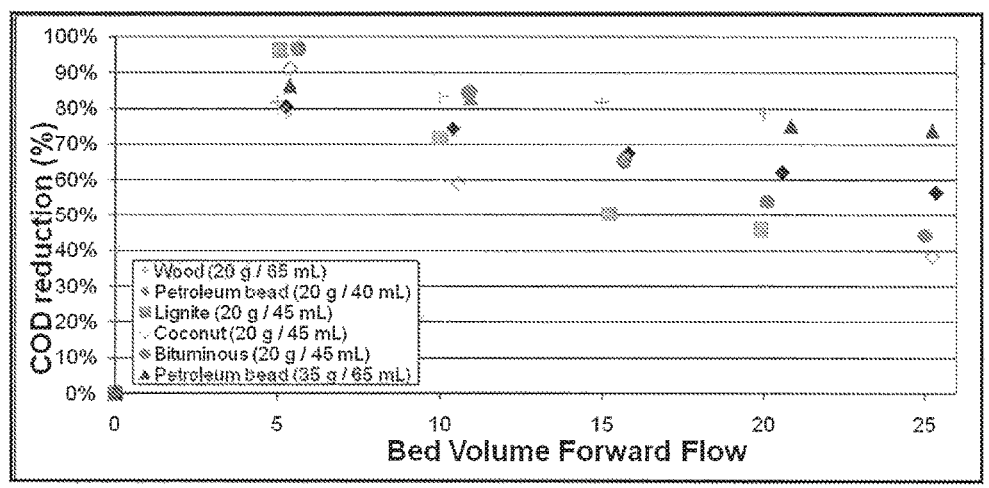
FIG. 8 presents comparison of various GAC media in a single column.

FIG. 8 presents a comparison of various GAC media in single column lab testing. As depicted in FIG. 8, the COD reduction was best with the wood based GAC and petroleum beads. The coconut, lignite, and bituminous based GAC did not perform as well, however, still may be useful or beneficial in some embodiments. The petroleum beads packed much tighter, which would require about 65% more GAC by weight as the wood-based GAC to achieve similar COD reduction.

Example 4

Testing of a laboratory scale system was performed as described in Example 1.

Three columns, a column filled with walnut shells followed by two GAC columns, were placed in series. Based on single column testing, it was expected that the walnut shells would remove some residual oils, reducing COD by about 20-30%. It was expected that the second GAC column would further polish the spent caustic, resulting in lower COD than in the single column testing.

Figure 9:
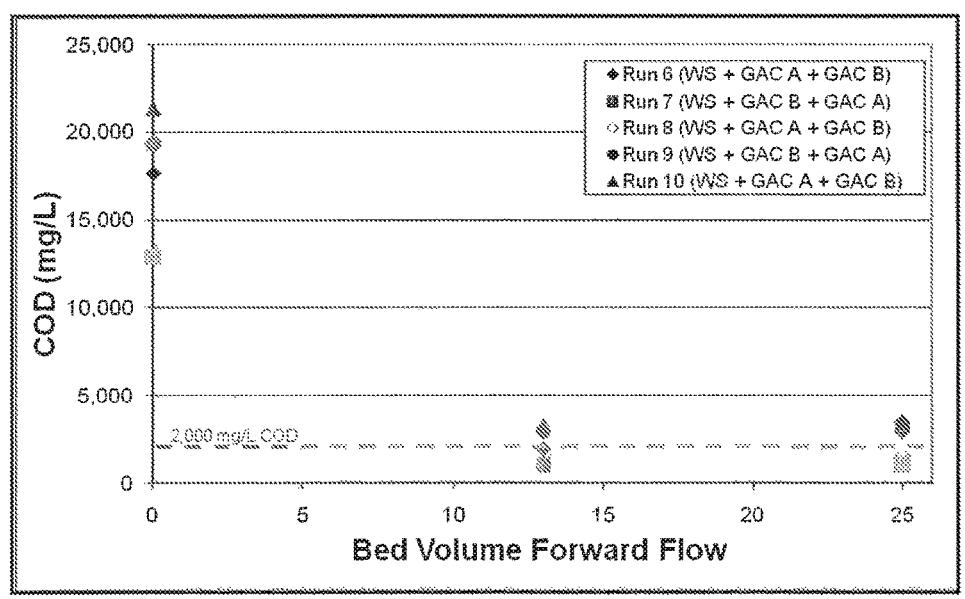
FIG. 9 presents feed and effluent COD during operation of a system incorporating a walnut shell filter followed by two GAC columns in series.

A total of seven regenerations were performed on GAC column A and two regenerations were performed on GAC column B. Raw spent caustic followed by a water rinse was used for the column regeneration. FIG. 9 presents feed and effluent COD during operation of a system incorporating a walnut shell filter followed by two GAC columns in series.

Total COD reduction ranged from 83-91% on the $25^{th}$ bed volume. In addition, as illustrated in Table 2 and FIG. 9, the similarity in COD for the $13^{th}$ bed volume and the $25^{th}$ bed volume indicates that regeneration was not yet required in this system at the $25^{th}$ bed volume.

TABLE 2

Feed and effluent COD during operation with three lab columns (walnut shells followed by two wood-based GAC columns).

| Run | Configuration | COD of Feed (mg/L) | COD of 13$^{th}$ BV Effluent (mg/L) | COD of 25$^{th}$ BV Effluent (mg/L) | 13$^{th}$ BV COD Reduction | 25$^{th}$ BV COD Reduction |
|---|---|---|---|---|---|---|
| 6 | Walnut Shell Filter (WS) + GAC Column A + GAC Column B | 17,630 | 1,912 | 2,920 | 89% | 83% |
| 7 | WS + GAC B + GAC A | 12,920 | 1,020 | 1,100 | 92% | 91% |
| 8 | WS + GAC A + GAC B | 13,240 | 1,600 | 1,540 | 88% | 88% |
| 9 | WS + GAC A + GAC B | 19,300 | 2,888 | 3,308 | 85% | 83% |
| 10 | WS + GAC B + GAC A | 21,340 | 3,240 | 3,460 | 85% | 84% |

As shown in Table 2 and FIG. 9, the final COD on Runs 6, 9, and 10 was higher than Runs 7 and 8; however, the feed COD was also higher for those runs. The COD reduction by the 25$^{th}$ bed volume remained comparable to the reduction measured at the 14$^{th}$ bed volume, indicating that the media had not yet reached breakthrough by the 25$^{th}$ volume. The three column configuration, therefore, may provide for a longer span between regenerations. Furthermore, similarities in the COD reduction across the different runs, whether measured at the 13$^{th}$ or 25$^{th}$ bed volume, indicate that even over multiple regeneration cycles, GAC in this three column system retains its ability to reduce COD.

Example 5

Since scale up may result in some differences in lab performance due to wall effects and surface area to volume ratio, further pilot tests were performed. Two tests on a pilot scale system were performed using a walnut shell filter to pretreat prior to GAC polishing. A 2"×66" column was filled with 20/30 mesh walnut shells followed by a 2"×24" column filled with GAC. The acidified spent caustic was acidified with concentrated sulfuric acid to a pH of 2.8-3.0. Acid oils were removed after more than 4 hours of settling in a 5 gallon bucket with a side tap.

A peristaltic pump was set to deliver 40 mL/min of acidified spent caustic to the system for a 30 minute contact time in the GAC column. Flow rates were periodically checked and ranged from 34-40 mL/min. A second peristaltic pump recycled walnut shell effluent for an 8.4 gpm/ft$^2$ flux through the walnut shell bed, to prevent channeling. Both forward flow and regeneration were down flow.

Samples were taken every 5 bed volumes on the effluent of each column to monitor the performance during both forward flow and regeneration. For this example, a "bed volume" is considered 1,030 mL, which was the estimated volume of the GAC bed.

Following each test, a 15 bed volume regeneration using raw spent caustic was followed by a 6 bed volume deionized water rinse. The first regeneration was performed at 40 mL/min for a 30 minute residence time and the second regeneration was performed at 80 mL/min for a 15 minute residence time.

The initial run on virgin GAC and new walnut shells showed over 90% COD reduction for the first 20 bed volumes of operation with the effluent COD remaining below 2,000 mg/L. The walnut shell filter removed a notable amount of COD, ranging from 38-61% through 25 bed volumes. Operation continued beyond 25 bed volumes, which verified that the GAC becomes spent around 25 bed volumes. The GAC column was then regenerated with raw spent caustic using forward flow. The walnut shells were not backwashed since it appeared that the COD from the walnut shell filter effluent was stable.

Figure 10:
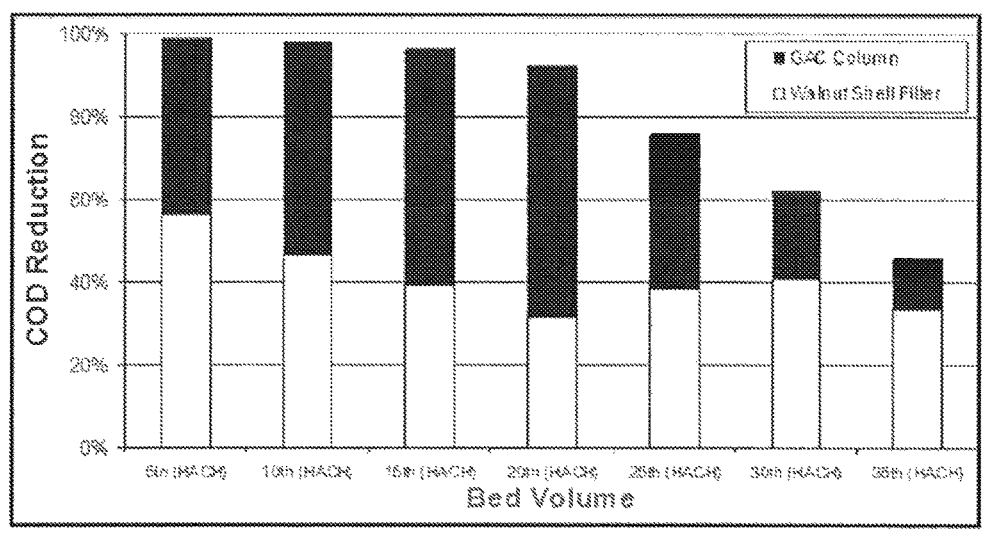
FIG. 10 presents COD reduction during operation with a walnut shell followed by a GAC column.
Figure 11:
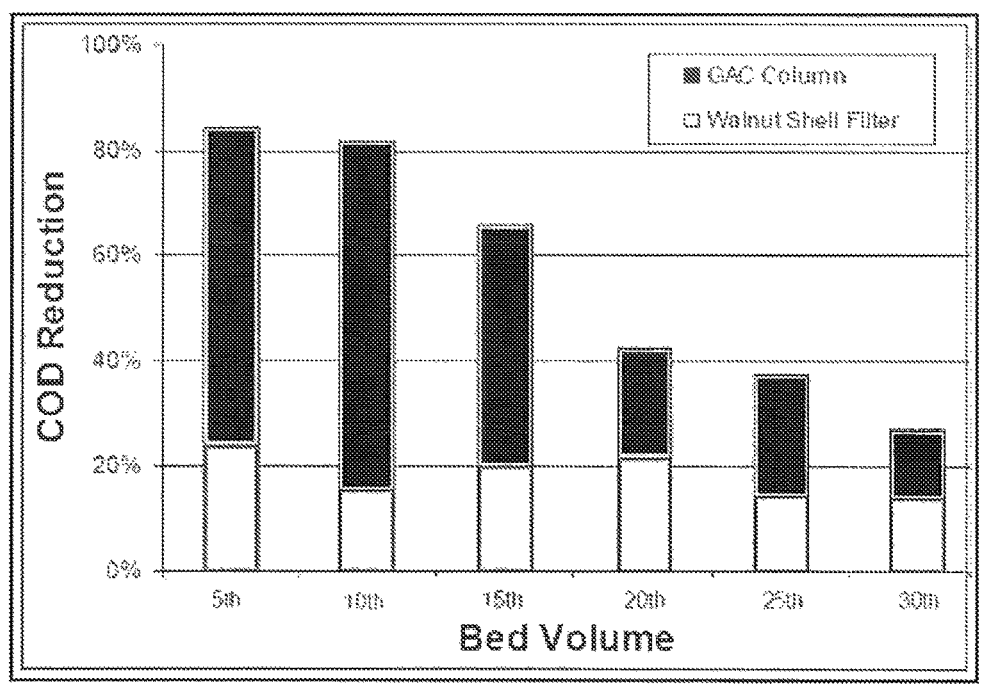
FIG. 11 presents COD reduction during operation with a walnut shell followed by a GAC column.

The COD reduction for Pilot Test 1 and Pilot Test 2 are depicted in FIGS. 10 and 11, respectively. FIG. 10 presents COD reduction during Pilot Test 1 of pilot operation with a walnut shell followed by a GAC column FIG. 11 presents COD reduction during Pilot Test 2 of pilot operation with a walnut shell followed by a GAC column.

Table 3 presents the reduction of species at various stages of treatment as measured during Pilot Test 2. The removal capacity of both the walnut shell filter and GAC column diminishes from the 15$^{th}$ bed volume to the 25$^{th}$ bed volume. A reduction in efficacy after some volume of treatment may occur. As the filter and media become loaded with more contaminants, the ability to remove species from the acidified stream may be reduced, demonstrating why a regeneration step may be ultimately needed. The feed column in Table 3 represents the acidified stream prior to passage through a walnut shell filter.

The system was effective for naphthenic acid removal, obtaining 93% removal at 25 bed volumes. It is possible that the walnut shell filter became spent since a large proportion of the naphthenic acids were removed with the walnut shell filter at 15 bed volumes, but significantly less at 25 bed volumes. Nonetheless, the GAC column was still able to remove most of the naphthenic acids.

TABLE 3

Pilot Test 2 analytical results during pilot operation with a walnut shell followed by a GAC column. *For single treatment step.

| Bed | | Feed | Walnut shell filter | | GAC column | | Overall Treatment | |
|---|---|---|---|---|---|---|---|---|
| Volume | | 0 | 15 | 25 | 15 | 25 | 15 | 25 |
| COD | mg/L | 10,100 | 7,850 | 8,220 | 4,010 | 7,100 | 4,010 | 7,100 |
| | % Reduction | — | 22%* | 19%* | 38%* | 11%* | 60% | 30% |
| Naphthenic Acids | mg/L | 3,100 | 1,220 | 2,240 | 398 | 880 | 398 | 880 |
| | % Reduction | — | 61%* | 28%* | 36%* | 65%* | 97% | 93% |
| Total Phenolics | mg/L | 768 | 625 | 717 | 293 | 538 | 293 | 538 |
| | % Reduction | — | 18%* | 6%* | 44%* | 24%* | 62% | 30% |
| Total Carbon | mg/L | 3,040 | 2,540 | 2,500 | 1,190 | 2,000 | 1,190 | 2,000 |
| | % Reduction | — | 16%* | 18%* | 45%* | 16%* | 61% | 34% |

Example 6

Approximately 50 mL of styrenic polymeric adsorbent was wetted and put in an ion exchange lab column. The acidified spent caustic was acidified with concentrated sulfuric acid to a pH of 2.8-3.0. Acid oils were removed after greater than 4 hours of settling in a separation funnel. A peristaltic pump was set to deliver 5 mL/min of spent caustic to the column Samples were periodically taken for COD readings. Both forward flow and caustic regeneration was down flow.

Figure 12:
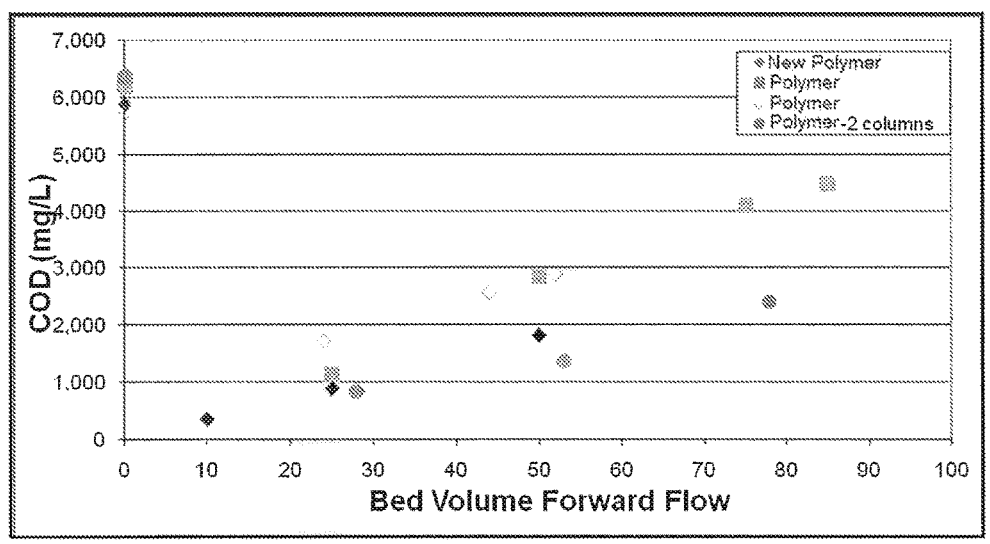
FIG. 12 presents a comparison of polymeric adsorbent column testing.

The first three tests were performed with a single column with one additional test performed with two columns in series. FIG. 12 presents a comparison of styrenic polymeric adsorbent column lab testing. As shown in FIG. 12, about 30-40 bed volumes can be treated before the COD is above 2,000 mg/L using the styrenic polymeric adsorbent resin.

Removals were 70-87% at 25 bed volumes as shown in Table 4. The addition of a second column in series did improve performance, with a COD of 2,410 mg/L at 78 bed volumes.

TABLE 4

COD after treatment with styrenic polymeric adsorbent.

| | Bed Volume | Feed 0 | Overall Treatment ~25 | ~50 |
|---|---|---|---|---|
| Run #1 (new styrenic polymeric adsorbent) | mg/L % Reduction | 5,880 — | 886 85% | 1,820 69% |
| Run #2 (after caustic regeneration) | mg/L % Reduction | 6,180 — | 1,124 82% | 1,820 54% |
| Run #3 (after caustic regeneration) | mg/L % Reduction | 5,720 — | 1,724 70% | 2,896 49% |
| Run #4 (after caustic regeneration with new styrenic polymeric adsorbent for lead column) | mg/L % Reduction | 6,380 — | 840 87% | 1,372 78% |

As indicated by the results presented in the table above, use of styrenic polymeric adsorbent may contribute to achieving a treatment goal of under 2,000 mg/L COD from naphthenic spent caustic.

Example 7

Additional pilot tests were performed. Two main variables were the use of polymeric adsorbent vs. GAC for the media, and steam vs. spent caustic for the method of regeneration. Each variable resulted in acceptable performance over the course of testing. A total of four media columns were tested, two with NUCHAR® WV-B, a granular activated carbon, and two with DOWEX OPTIPORE® resin, a styrenic polymeric adsorbent. Each 2" media column was filled to about 34" of media, resulting in a bed volume of about 2 L. The synthetic spent caustic was made by mixing $Na_2SO_4$, phenols, cresols, and naphthenic acid oil into tap water at a pH greater than 11, then the pH was lowered to less than 3 to spring out the acid oils. The acid oil layer was allowed to float in the feed tank. Most tests had 50 g/L $Na_2SO_4$, 1 g/L phenols, 1 g/L cresols, and 1 g/L naphthenic acid oil. A peristaltic pump was set to deliver 170 mL/min of spent caustic to the column (5 bed volumes (BV)/hr), but some flow fluctuation occurred. Samples were periodically taken for COD readings. Forward flow was down flow and regeneration was up flow. For cycles utilizing steam regeneration, steam regeneration was performed with 40-50 psig steam for two hours at about 4 BV/hr. For cycles utilizing spent caustic regeneration, spent caustic regeneration was performed (4% NaOH, 5 g/L $Na_2SO_4$, 10 g/L naphthenic acid oil) at 5 BV/hr for 2 hours, followed by a 4-5 BV (bed volume) tap water rinse.

Figure 13:
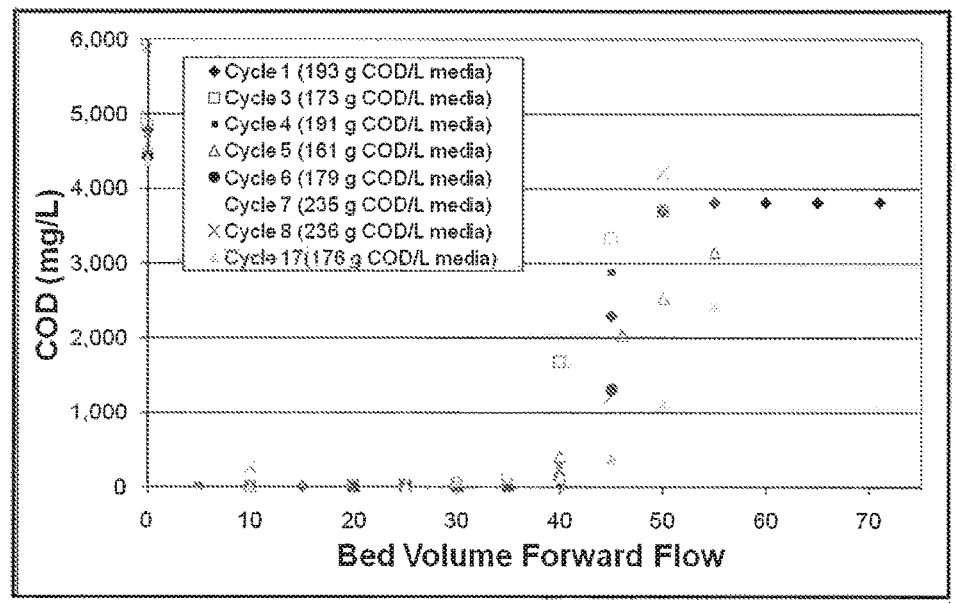
FIG. 13 presents feed and effluent COD values at different bed volume forward flows for various cycles of steam regenerated polymeric adsorbent media.

Referring to FIG. 13, data are presented of the COD concentrations for streams exiting columns utilizing styrenic polymeric adsorbent resins that have undergone various cycles of steam regeneration. As illustrated in FIG. 13, styrenic polymeric adsorbent was steam regenerated many times without deterioration of performance. The data presented in FIG. 13 indicate that steam regeneration of styrenic polymeric adsorbent regenerates the media to a state in which its effectiveness is comparable to virgin media (media that has not yet been introduced to COD loading from the system as used during Cycle 1). The streams entering the media had a COD in the range of about 4,000 to about 6,000 mg/L. FIG. 13 indicates that for these particular trials breakthrough did not occur until after more than 40 bed volumes of the acidified stream had been passed through the vessel. Therefore, steam regeneration may not be required until after the $40^{th}$ bed volume of forward flow. The comparable performance of the various regeneration cycles further indicates that replacement of the media may not be required until well after the $17^{th}$ regeneration cycle under the tested conditions.

Figure 14:
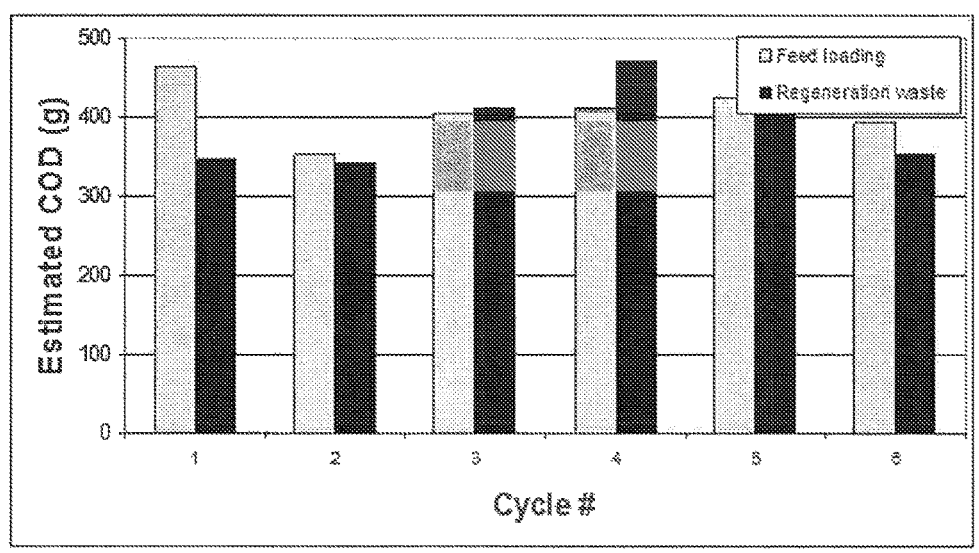
FIG. 14 presents the total loading of COD adsorbed onto media during various regeneration cycles and the total COD removed from the media during steam regeneration.

Referring to FIG. 14, data are presented of the total COD of the styrenic polymeric adsorbent resin from the feed stream over the course of a cycle compared to the total COD loading in the regeneration waste stream representing the amount of COD removed from the resin during each cycle's regeneration phase. FIG. 14 presents the total loading of COD adsorbed onto the adsorbent polymeric media during various regeneration cycles and the total COD removed from that media during steam regeneration. The comparable values between the COD media loading and the regeneration waste indicate that the steam regeneration may return the media to a near-virgin state (near-zero COD-loading) over multiple regeneration cycles. During the cycles of operation portrayed in FIG. 14, the spent caustic feed consisted of 50 g/L $Na_2SO_4$, 1 g/L phenol, and 1 g/L cresol and no naphthenic acid oil.

Figure 15:
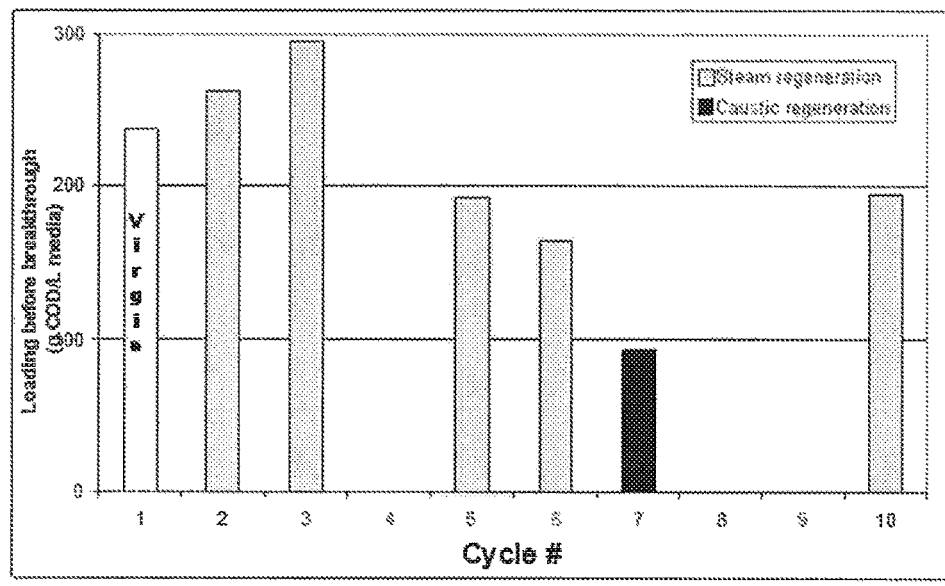
FIG. 15 presents estimated COD loading before breakthrough of polymeric adsorbent Test Column A.

For media Column A, which comprised styrenic polymeric adsorbent resin, ten cycles of regeneration were performed. For some of the cycles, regeneration was performed using steam. For other cycles, regeneration was performed using spent caustic. For each cycle, a total COD loading of the media column was measured at the time of breakthrough. FIG. 15 presents those data. As indicated by FIG. 15, the total COD loading following steam regeneration in the tenth cycle was comparable to the total COD loading of the virgin media. Therefore, steam regenerated styrenic polymeric adsorbent resin even after ten cycles is comparable to virgin media, indicating that steam regeneration may contribute to a relatively long resin lifespan.

Figure 16:
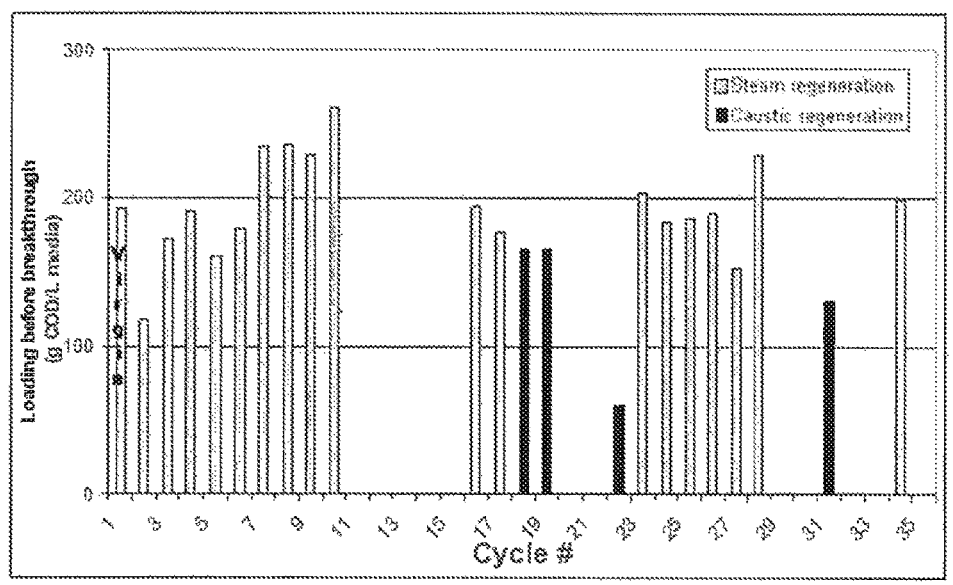
FIG. 16 presents estimated COD loading before breakthrough of polymeric adsorbent Test Column B.

For media Column B, which comprised styrenic polymeric adsorbent resin, 37 cycles of regeneration were performed. For some of the cycles, regeneration was performed using steam. For other cycles, regeneration was performed using spent caustic. For each cycle, a total COD loading of the media column was measured at the time of breakthrough. FIG. 16 presents those data. As indicated by FIG. 16, the total COD loading following steam regeneration in the 37th cycle was comparable to the total COD loading of the virgin media. Therefore, steam regenerated styrenic polymeric adsorbent resin even after 37 cycles is comparable to virgin media, indicating that steam regeneration may contribute to a relatively long resin lifespan.

Figure 17:
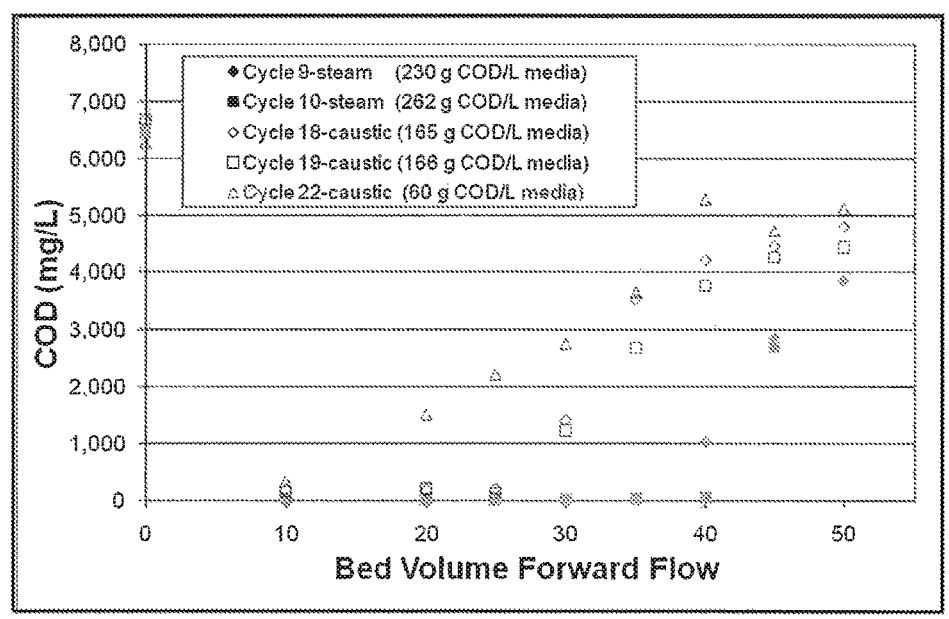
FIG. 17 presents feed and effluent COD values from polymeric adsorbent media at various bed volume forward flows for both steam and spent caustic regeneration cycles.

FIG. 17 presents a scatter plot of the COD of effluent from styrenic polymeric adsorbent media at various bed volumes of forward flow for both steam and spent caustic regeneration cycles. For steam regeneration cycles 9 and 10 breakthrough does not occur until after approximately 40 bed volumes of forward flow. For spent caustic regeneration cycles 18 and 19, breakthrough occurred between bed volumes 25 and 30. For spent caustic regeneration cycle 22, breakthrough occurred around bed volume 20.

Figure 18:
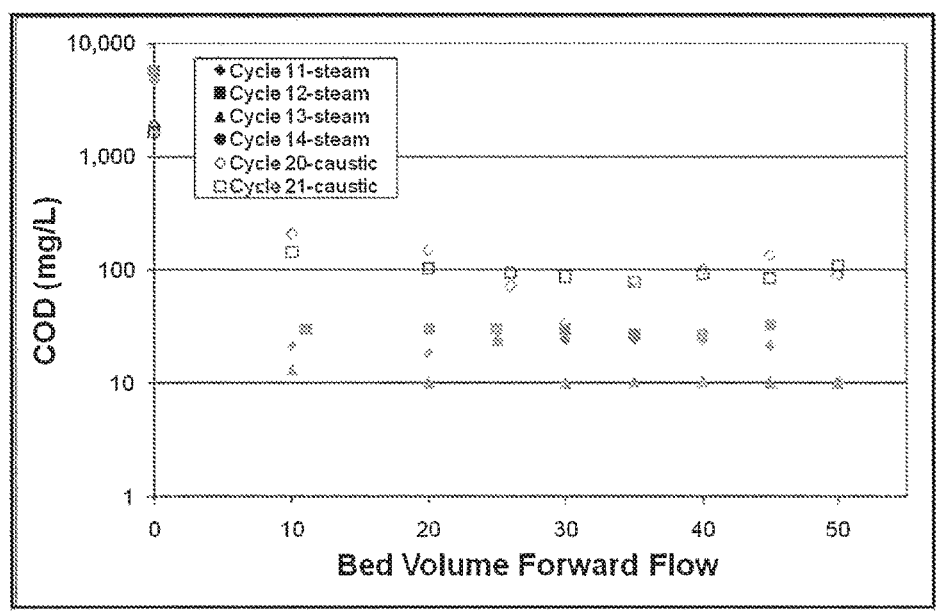
FIG. 18 presents a comparison of steam and media regeneration of polymeric adsorbent media in a low COD feed.

As shown in FIG. 18, at lower feed concentrations of COD (used 50 mg/L cresol, 50 mg/L phenol, 50 mg/L naphthenic acid oil, and 50 g/L $Na_2SO_4$ solution), no breakthrough occurred. In FIG. 18 a scatter plot is presented comparing steam and caustic regeneration of styrenic polymeric adsorbent media through 50 volumes of forward flow.

Figure 19:
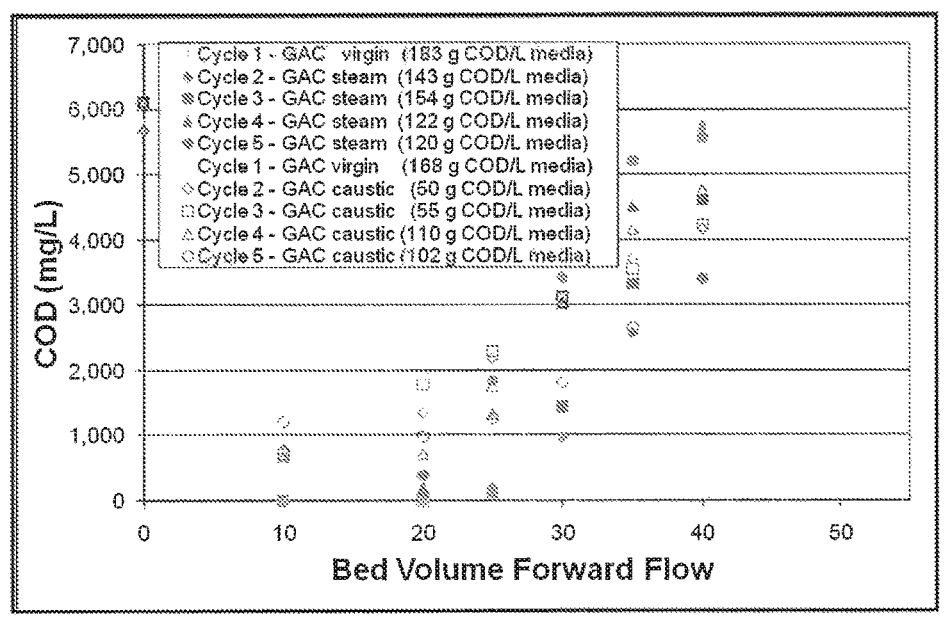
FIG. 19 presents feed and effluent COD values from GAC media at various bed volume forward flows for steam and spent caustic regeneration cycles compared to virgin GAC.

FIG. 19 presents a comparison of GAC with steam and spent caustic regeneration compared to virgin media. FIG. 19 shows steam regeneration restoring GAC to an effectiveness level comparable with virgin media.

Figure 20:
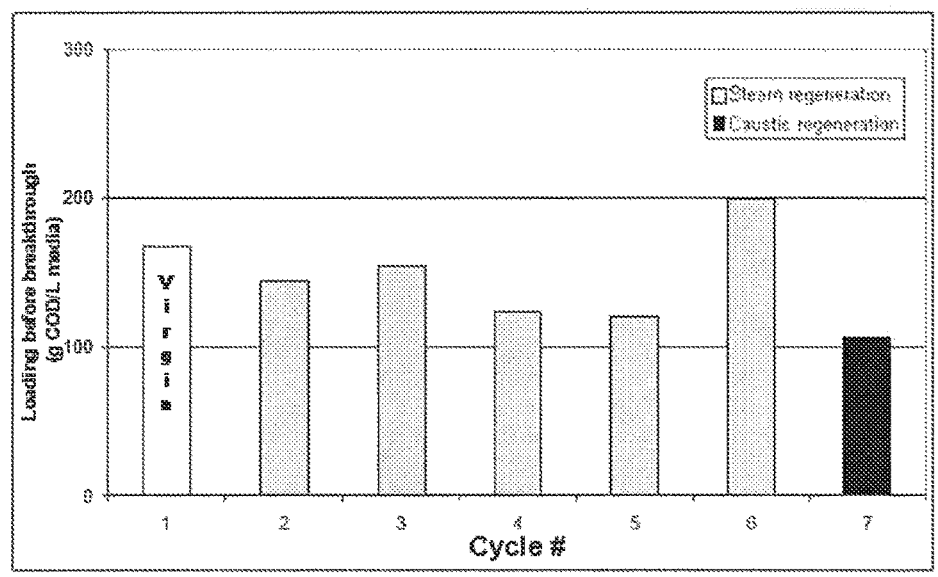
FIG. 20 presents estimated COD loading before breakthrough of GAC Test Column C.
Figure 21:
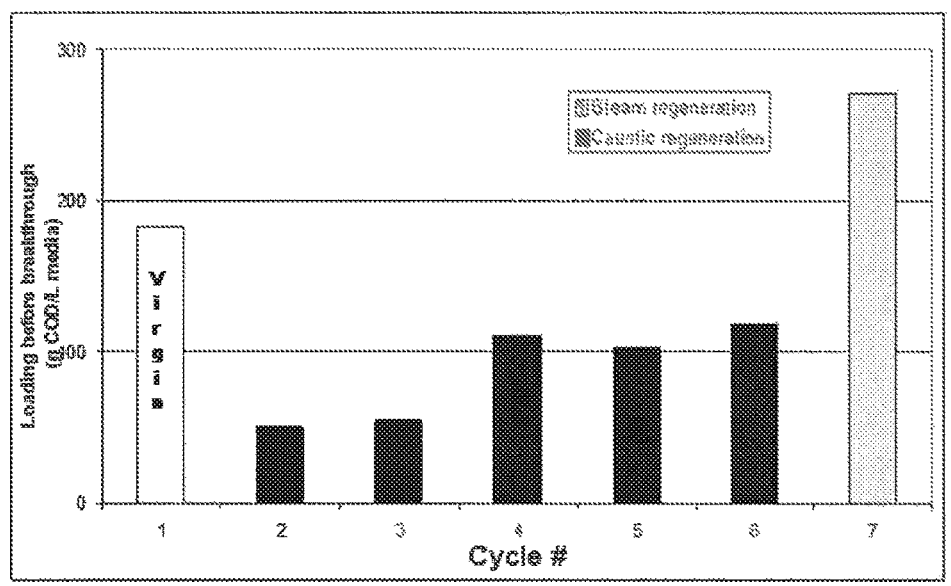
FIG. 21 presents estimated COD loading before breakthrough of GAC Test Column D.

For media columns C and D which comprised GAC, seven cycles of treatment and regeneration were performed. As with the styrenic polymeric adsorbent media, the GAC after several cycles of steam regeneration had similar loading as that of the virgin media, as illustrated in FIG. 20 and FIG. 21, presenting the results for column C and column D, respectively.

Figure 22:
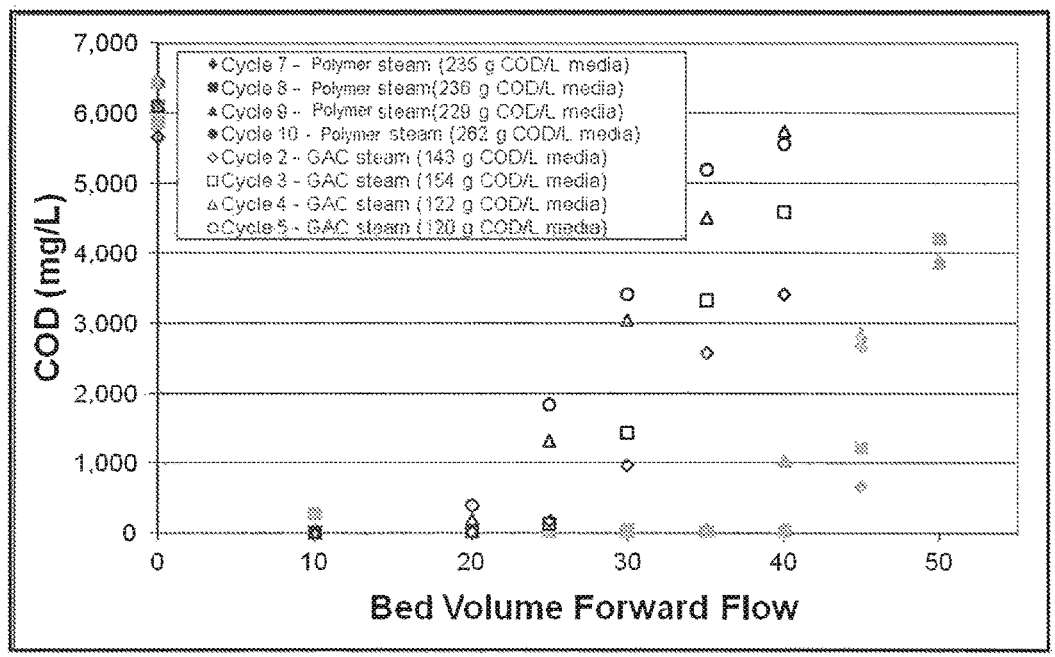
FIG. 22 presents feed and effluent COD values at different bed volume forward flows for various cycles of GAC and polymeric adsorbent regenerated by steam.

FIG. 22 presents a scatter plot of COD at different bed volume forward flows for various cycles of GAC and styrenic polymeric adsorbent media regenerated by steam. The streams entering the media have a COD in the range of about 5,000 to about 7,000 mg/L. FIG. 22 indicates that for these particular tests, breakthrough occurred with the GAC media at around 20 to 30 bed volumes. This breakthrough period may indicate that after 20 to 30 bed volumes of flow, regeneration may need to occur. The testing showed similar performance of the GAC from cycle 2 through cycle 4, which may indicate that the media may be capable of successful regeneration in this cycle range.

FIG. 22 also shows values for styrenic polymeric adsorbent media after regeneration cycles 7 through 10. For styrenic polymeric adsorbent media, breakthrough occurred around bed volumes 40 to 45. These breakthrough values may indicate that regeneration of the styrenic polymeric adsorbent media by steam, at least for this cycle range, may occur around 40-45 bed volumes. The fact that styrenic polymeric adsorbent media is able to reduce COD to under 2,000 mg/L indicates that this media may undergo multiple regenerations before the media may, ultimately, have to be replaced.

Figure 23:
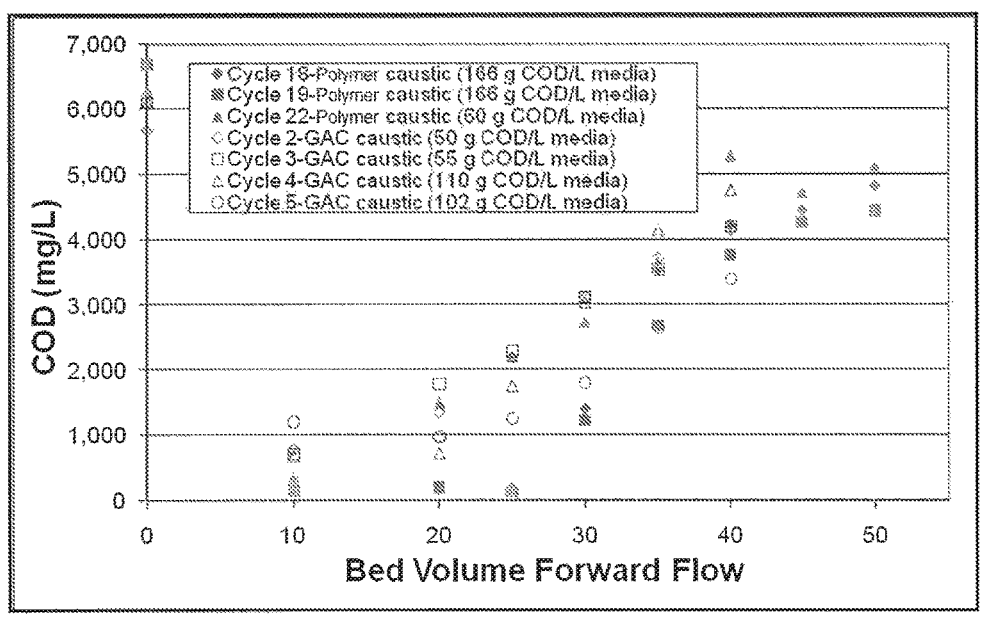
FIG. 23 presents feed and effluent COD values at different bed volume forward flows for various cycles of GAC and polymeric adsorbent regenerated by spent caustic.

Styrenic polymeric adsorbent media and GAC had similar COD loading with caustic regeneration as shown in FIG. 23; however, styrenic polymeric adsorbent media was able to achieve lower COD in the effluent prior to breakthrough. A set of experiments were performed using granular activated carbon and styrenic polymeric adsorbent media. The streams entering the media have a COD in the range of 5,000 to 6,000 mg/L.

FIG. 23 presents a scatter plot of COD at different bed volume forward flows for various cycles of GAC and styrenic polymeric adsorbent media regenerated by spent caustic. The figure indicates that for these particular tests, breakthrough occurred with the GAC media at around 20 to 25 bed volumes. This breakthrough period may indicate that after 20 to 25 bed volumes of flow, regeneration may need to occur. The testing showed similar performance of the GAC from cycle two through cycle four, which may indicate that the media is capable of successful regeneration in this cycle range. The number of cycles or runs refers to the number of regenerations that the media have undergone.

FIG. 23 also shows values for styrenic polymeric adsorbent media after regeneration cycles 18, 19, and 22. For styrenic polymeric adsorbent media, breakthrough occurred around bed volumes 25-35. These breakthrough values may indicate that regeneration of the styrenic polymeric adsorbent media by spent caustic, at least for this cycle range, may occur around 25-35 bed volumes. The fact that styrenic polymeric adsorbent media is able to reduce COD to under 2,000 mg/L indicates that this media may undergo many regenerations before the media may, ultimately, have to be replaced.

Those skilled in the art would readily appreciate that the various configurations described herein are meant to be exemplary and that actual configurations will depend upon the specific application for which the spent caustic treatment system and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a wastewater treatment system. It is, therefore, to be understood that the foregoing embodiments are presented by way of example only and that, within the scope of the appended claims and equivalents thereto, the disclosed system and methods may be practiced otherwise than as specifically described. The present system and methods are directed to each individual feature or method described herein. In addition, any combination of two or more such features, system or methods, if such features, system or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the system and methods may involve connecting or configuring an existing facility to a treatment system. Accordingly, the foregoing description and drawings are by way of example only. Further, the depictions in the drawings do not limit the disclosures to the particularly illustrated representations.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed many modifications, additions, and deletions may be made therein without departing from the spirit and scope of the disclosure and its equivalents, as set forth in the following claims.

What is claimed is:

1. A method for treating a spent caustic stream from a petrochemical or petroleum refinery process and regenerating adsorbent media, the method comprising:

during a spent caustic treatment stage, mixing a first portion of the spent caustic stream with an acid to provide a mixed stream with a reduced pH;

introducing the mixed stream to a separator or separation zone to separate the mixed stream into a bottoms layer, a brine layer, and an oils layer;

separating out the bottoms layer and the oils layer and directing the brine layer from the separator or separation zone, the brine layer being an acidified stream;

introducing the acidified stream to a first inlet of a first vessel comprising adsorbent media and passing the acidified stream through said first vessel so as to remove organic species and other contaminants from said acidified stream to produce a polished stream exiting the first vessel; and during a regeneration stage, introducing a second portion of the spent caustic stream to a second inlet of the first vessel to regenerate the adsorbent media in the first vessel;

wherein the mixing of the first portion of the spent caustic stream with an acid comprises reducing the pH to a range of about 1 to about 3.

2. The method of claim 1, further comprising introducing the acidified stream to an inlet of a walnut shell filter apparatus prior to introducing the acidified stream to the first inlet of the first vessel comprising adsorbent media.

3. The method of claim 2, further comprising:

introducing at least one of a third portion of the spent caustic stream, a portion of the acidified stream, and a portion of the polished stream to a second inlet of the walnut shell filter apparatus; and backwashing the walnut shell filter apparatus with at least one of the third portion of the spent caustic stream, the portion of the acidified stream, and the portion of the polished stream.

4. The method of claim 1, further comprising ceasing introduction of the acidified stream to the first inlet of the first vessel prior to introducing the second portion of the spent caustic stream to the second inlet of the first vessel.

5. The method of claim 4, further comprising introducing the acidified stream to a first inlet of a second vessel comprising the adsorbent media, wherein introducing the acidified stream to the second vessel and introducing the second portion of the spent caustic stream to the first inlet of the first vessel occur simultaneously.

6. The method of claim 5, further comprising introducing the second portion of the spent caustic stream to a second inlet of the second vessel to regenerate the adsorbent media in the second vessel, wherein introducing the second portion of the spent caustic stream to the second vessel and introducing the acidified stream to the first vessel occur simultaneously.

7. The method of claim 1, wherein introducing the acidified stream to a first inlet of a first vessel comprises passing the acidified stream through the first vessel comprising adsorbent media at a flow rate in a range of about 1 $m^3$/hr to about 4 $m^3$/hr.

8. The method of claim 1, wherein the adsorbent media comprise at least one of granular activated carbon and a polymeric adsorbent.

9. The method of claim 1, wherein a chemical oxygen demand of the spent caustic stream is from about 15 g/L to about 500 g/L.

10. The method of claim 1, wherein introducing the portion of the spent caustic stream to the second inlet of the first vessel to regenerate the adsorbent media in the first vessel comprises regenerating the adsorbent media to at least 80% of a virgin adsorption capacity of the adsorbent media.

* * * * *